US011166238B2

(12) United States Patent
Jiang et al.

(10) Patent No.: US 11,166,238 B2
(45) Date of Patent: Nov. 2, 2021

(54) METHODS AND APPARATUS FOR SUPPORTING MULTIPLE POWER AND SPECTRUM EFFICIENT MODES FOR POWER SAVING

(71) Applicant: QUALCOMM Incorporated, San Diego, CA (US)

(72) Inventors: Jing Jiang, San Diego, CA (US); Peter Pui Lok Ang, San Diego, CA (US); Ashok Mantravadi, San Diego, CA (US); Aamod Khandekar, San Diego, CA (US); Krishna Kiran Mukkavilli, San Diego, CA (US); Joseph Binamira Soriaga, San Diego, CA (US); Naga Bhushan, San Diego, CA (US); Yuanning Yu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/544,742

(22) Filed: Aug. 19, 2019

(65) Prior Publication Data

US 2020/0092818 A1 Mar. 19, 2020

Related U.S. Application Data

(60) Provisional application No. 62/731,015, filed on Sep. 13, 2018.

(51) Int. Cl.
*H04W 24/10* (2009.01)
*H04W 52/02* (2009.01)
(Continued)

(52) U.S. Cl.
CPC ......... *H04W 52/0261* (2013.01); *H04W 8/24* (2013.01); *H04W 24/10* (2013.01); *H04W 88/06* (2013.01)

(58) Field of Classification Search
None
See application file for complete search history.

(56) References Cited

U.S. PATENT DOCUMENTS 7,924,775 B2* 4/2011 Khan ............... H04L 1/0003 370/328
2011/0003609 A1* 1/2011 Sundstrom ........ H04W 52/0206 455/509

(Continued)

OTHER PUBLICATIONS

Intel Corporation: "Use Cases for UE Initiated Capability Change", 3GPP TSG-RAN WG2 Meeting #97, 3GPP Draft; R2-1701741_UE Capabiltiy_NR_Final, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017 (Feb. 12, 2017), pp. 1-3, XP051212314, Retrieved from the Internet: URL: http://www.3gpp.org/ftp/Meetings_3GPP_SYNC/RAN2/Docs/ [retrieved on Feb. 12, 2017] the whole document.

(Continued)

*Primary Examiner* — Sithu Ko
*Assistant Examiner* — Emmanuel K Maglo
(74) *Attorney, Agent, or Firm* — Qualcomm Incorporated

(57) ABSTRACT

In an aspect, a UE may determine a set of parameters associated with each of a plurality of different operation modes supported by the UE and transmit UE capability information including the set of parameters to a base station, where at least one operation mode comprises a power efficient mode. The UE may receive configuration information based on the UE capability information including an indication of an operation mode of the plurality of different operation modes. A base station may receive UE capability information including a set of parameters associated with each of a plurality of different operation modes supported by a UE and determine an operation mode of the plurality of (Continued)

different operation modes for the UE based on the UE capability information. The base station may transmit configuration information including an indication of the operation mode of the plurality of different operation modes.

88 Claims, 11 Drawing Sheets

(51) Int. Cl.
*H04W 8/24* (2009.01)
*H04W 88/06* (2009.01)

(56) References Cited

U.S. PATENT DOCUMENTS

| | | | | |
|---|---|---|---|---|
| 2012/0063500 | A1* | 3/2012 | Wang | H04B 7/0639 375/224 |
| 2014/0105049 | A1* | 4/2014 | Kim | H04W 24/10 370/252 |
| 2016/0050680 | A1* | 2/2016 | Simonsson | H04B 7/0689 370/329 |
| 2017/0099658 | A1* | 4/2017 | Shattil | H04L 63/061 |
| 2017/0367058 | A1* | 12/2017 | Pelletier | H04W 52/246 |
| 2018/0049215 | A1* | 2/2018 | Gheorghiu | H04W 52/146 |
| 2018/0199185 | A1* | 7/2018 | Tenny | H04W 8/22 |
| 2020/0029274 | A1* | 1/2020 | Cheng | H04B 17/309 |
| 2020/0145079 | A1* | 5/2020 | Marinier | H04B 7/0456 |

OTHER PUBLICATIONS

International Search Report and Written Opinion—PCT/US2019/047274—ISA/EPO—dated Oct. 11, 2019.

Qualcomm Incorporated: "CSI Reporting for sTTI", 3GPP TSG RAN WG1 #90b, 3GPP Draft; R1-1718108 CSI Reporting for STTI, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), pp. 1-5, XP051341290, Retrieved from the Internet: URL: http://www.3gpp.org/ftp/Meetings_3GPP_SYNC/RAN1/Docs/ [retrieved on Oct. 8, 2017] the whole document.

"R1-1809619 Rel-15 LTE UE Feature List_Clean", 3GPP Draft; R1-1809619 REL-15 LTE UE Feature List_Clean, 3rd Generation Partnership Project (3GPP), Mobile Competence Centre; 650, Route Des Lucioles; F-06921 Sophia-Antipolis Cedex; France, Aug. 23, 2018 (Aug. 23, 2018), 10 Pages, XP051516978, Retrieved from the Internet: URL: http://www.3gpp.org/ftp/tsg%5Fran/WG1%5FRL1/TSGR1%5F94/Docs/R1%2D1809617%2Ezip [retrieved on Aug. 23, 2018].

* cited by examiner

METHODS AND APPARATUS FOR SUPPORTING MULTIPLE POWER AND SPECTRUM EFFICIENT MODES FOR POWER SAVING

CROSS REFERENCE TO RELATED APPLICATION(S)

This application claims the benefit of U.S. Provisional Application Ser. No. 62/731,015, entitled "METHODS AND APPARATUS FOR SUPPORTING MULTIPLE POWER AND SPECTRUM EFFICIENT MODES FOR POWER SAVING" and filed on Sep. 13, 2018, which is expressly incorporated by reference herein in its entirety.

BACKGROUND

Technical Field

The present disclosure relates generally to communication systems, and more particularly, to methods and apparatus for supporting multiple power and/or spectrum efficient operation modes for low power operations in wireless communication devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects and features related to power saving in wireless communication systems are described. Some aspects described herein allow supporting multiple power and/or spectrum efficient modes/configurations in wireless communication devices, e.g., such as IoT devices, to facilitate low power operations and/or reduce power consumption.

In an aspect of the disclosure, a method, a computer-readable medium, and an apparatus are provided. The apparatus, e.g., a user equipment (UE), may be configured to determine a set of parameters associated with each of a plurality of different operation modes supported by the UE, where at least one of the plurality of different operation modes comprises a power efficient mode. The apparatus may be further configured to transmit UE capability information to a base station, the capability information including the set of parameters. In some configurations, the apparatus may receive configuration information for the UE based on the UE capability information, the configuration information including an indication of an operation mode of the plurality of different operation modes, and switch to operate in the indicated mode.

In another aspect of the disclosure, a method, a computer-readable medium, and an apparatus are provided. The apparatus (e.g., a base station) may be configured to receive UE capability information including a set of parameters associated with each of a plurality of different operation modes supported by a UE, where at least one of the plurality of different operation modes comprises a power efficient mode. The apparatus may be further configured to determine an operation mode of the plurality of different operation modes for the UE based on the UE capability information. The apparatus may transmit, to the UE, configuration information for the UE based on the UE capability information, the configuration information including an indication of the operation mode of the plurality of different operation modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
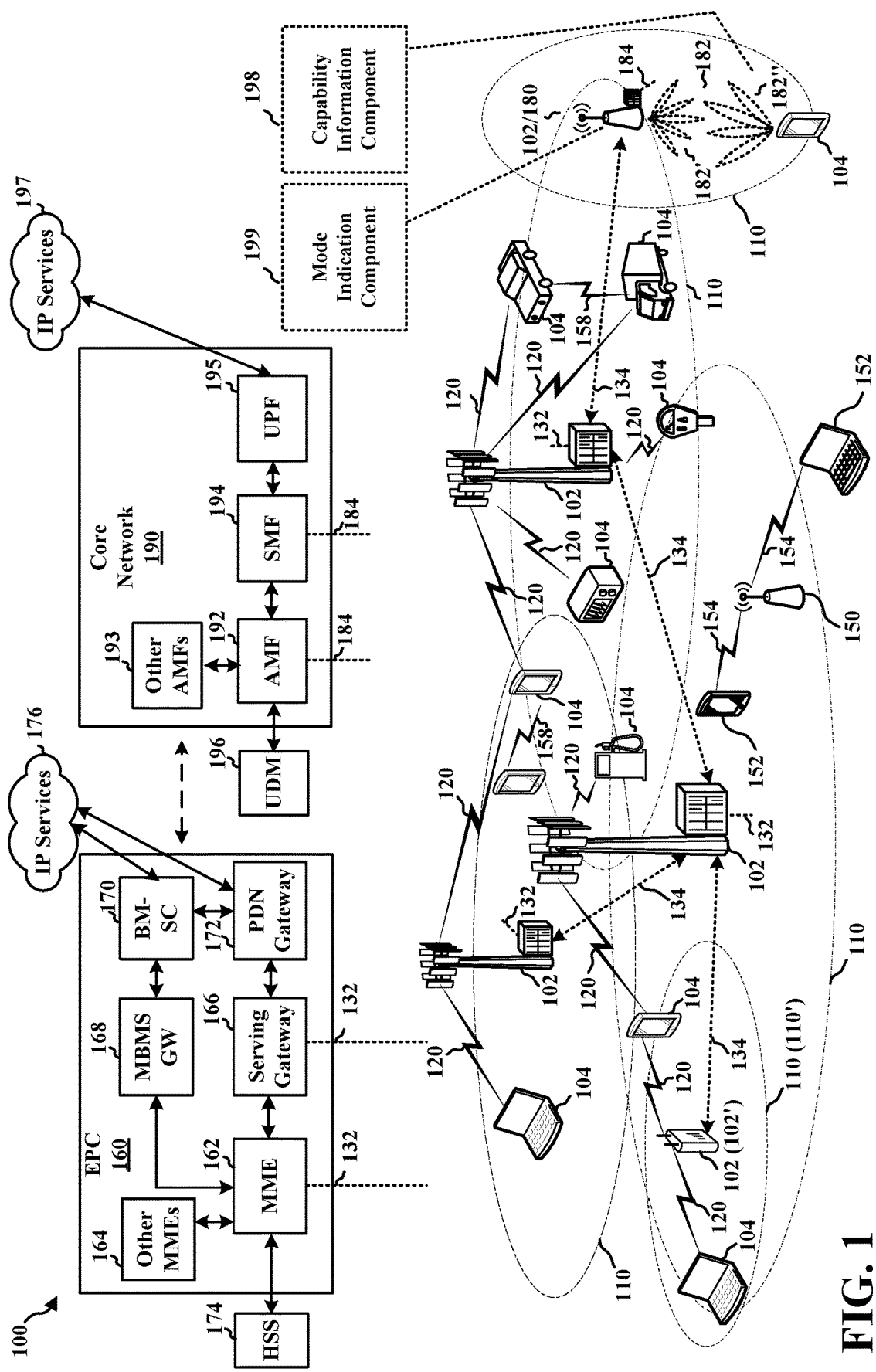
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a capability information component 198 which is configured to determine a set of parameters associated with each of a plurality of different operation modes supported by the UE 104, where at least one of the plurality of different operation modes comprises a power efficient mode. The capability information component 198 is also configured to transmit UE capability information to a base station 180, the capability information including the set of parameters, and receive configuration information for the UE 104 based on the UE capability information, the configuration information including an indication of an operation mode of the plurality of different operation modes. In certain aspects, the capability information component 198 may further transmit CSI report(s) corresponding to the supported modes. In certain aspects, the capability information component 198 may receive the indication based on the UE capability information and/or the CSI report(s) transmitted by the UE 104. Furthermore, in certain aspects, the base station 180 may include a mode indication component 199 which is configured to receive the UE capability information including the set of parameters associated with each of the plurality of different operation modes supported by the UE 104 and/or the CSI report(s) corresponding to the supported modes, where at least one of the plurality of different operation modes comprises a power efficient mode. The mode indication component 199 is also configured to determine an operation mode of the plurality of different operation modes for the UE 104 based on the received UE capability information and/or the CSI report(s), and transmit, to the UE, configuration information for the UE based on the UE capability information, the configuration information including an indication of the determined operation mode to be used by the UE 104. Further related aspects and features are described in more detail in connection with FIGS. 5-11. Although the following description may be focused on 5G NR, the concepts described herein may be applicable to other similar areas, such as LTE, LTE-A, CDMA, GSM, and other wireless technologies.

Figure 2:
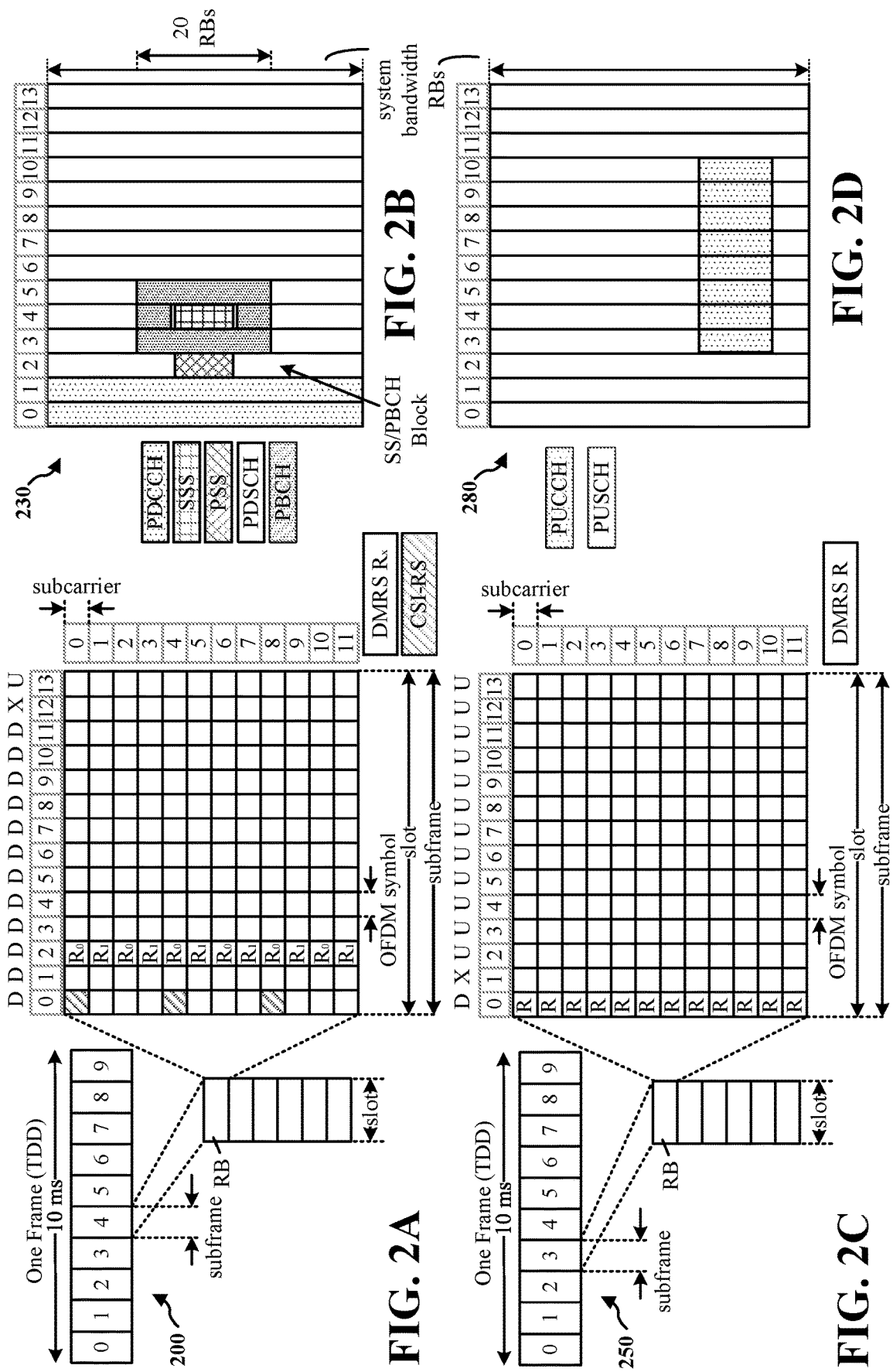
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
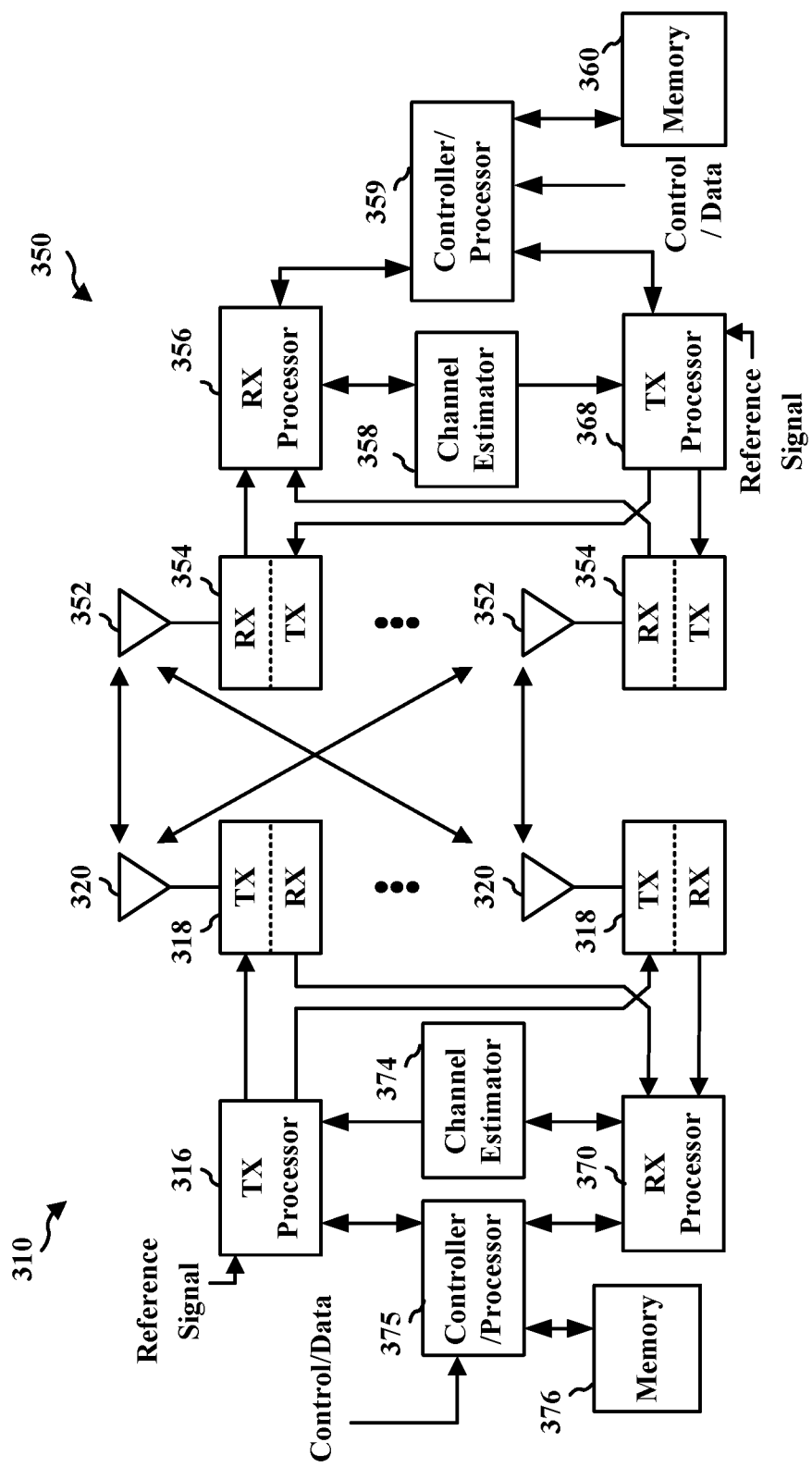
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with capability information component 198 of FIG. 1.

At least one of the TX processor 316, the RX processor 370, and the controller/processor 375 may be configured to perform aspects in connection with mode indication component 199 of FIG. 1.

Figure 4:
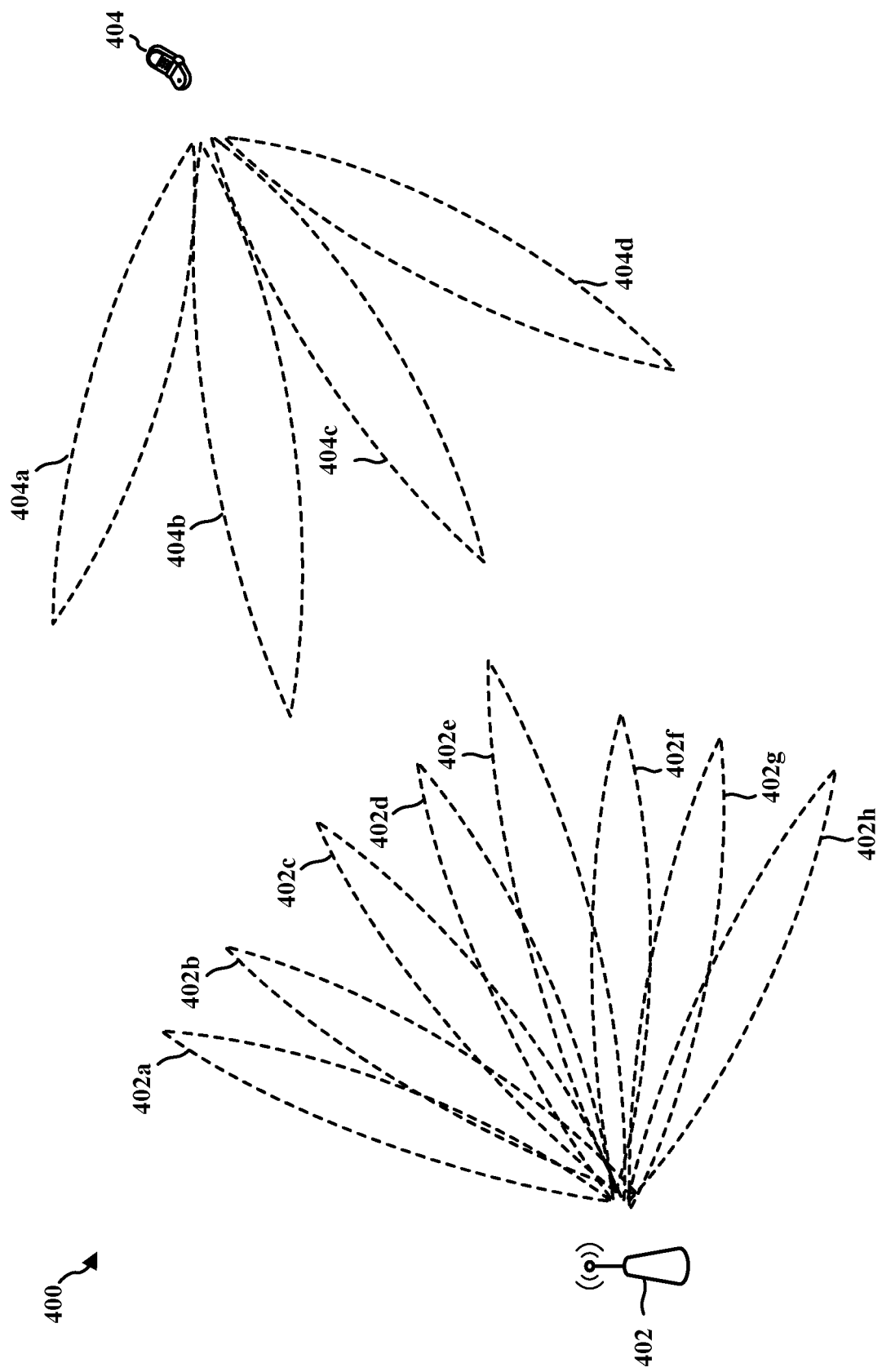
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

While the above discussion with reference to FIG. 4 focuses on beamformed communication between a base station and a UE, it should be appreciated that the same concept of beamformed communication may be applicable to communication between any pair of devices such as, for example, between two UEs where two UEs may transmit and receive beamformed signals.

Some NR communication systems may support scalable much wider channel BW (CBW) compared to LTE, which relates to data rate, latency, bandwidth, and/or spectrum bands that can be supported. The wide CBW may allow more efficient use of resources than the existing carrier aggregation (CA) schemes. Furthermore, NR provides a mechanism to adjust a UE's operating BW based on the bandwidth part (BWP) concept. With BWP, a UE may not be required to transmit or receive outside of a configured frequency range of an active BWP (except for measurement gaps). The BWP concept allows improvement in power efficiency and/or reduction in power consumption thereby facilitating low power operations.

The concept of BWP for NR may allow operating UEs with smaller BW than the configured CBW, which enables power efficient operations. With the use of BWP, a UE may not be required to transmit or receive outside of the configured frequency range of the active BWP, which allows for and results in power saving. The power saving may be attributed to certain aspects. For example, there may be power savings in some scenarios due to the possibility to operate the RF-baseband interface (e.g., of a UE) with a lower sampling rate and reduced baseband processing needed to transmit or receive with narrower bandwidth. As another example, the bandwidth adaptation may provide UE power savings if the carrier bandwidth prior to bandwidth adaptation is large.

In 5G/NR a BWP framework may be used to adjust UE receiver bandwidth. The BWP framework may be a useful tool for enabling low power operations. For example, in Connected Mode Discontinuous Reception (CDRx) wakeup, a small BWP may be used to monitor control signaling. DCI signaling may be used for BWP switching for data reception, and data scheduling may be delayed (e.g., K0>0, where K0 is a slot offset used for determining the slot allocated for PDSCH scheduled by DCI) for UE switch time. For example, DCI may provide an indication to the IoT device to switch bandwidth part (switch to another bandwidth portion) for data reception.

While bandwidth part switch addresses certain aspects of UE power consumption, there are several other factors that may affect device power consumption. In accordance with the proposed methods described herein, other aspects of power saving may be incorporated in a BWP framework and/or with wake-up radio (WUR) signaling. The concept of wake-up radio may be understood with an example of a receiver in a very low power mode that may wake up just in time for the data to be received, while remaining asleep at other times to conserve power. Such a concept may be very useful in low power devices, for example, devices intended for IoT and/or enhanced machine type communication (eMTC) applications that may infrequently transmit and receive small amounts of data (e.g., a few times in a given time period). However, an IoT device may not know when to expect to receive data, and thus may perform scanning (which drains the battery) to detect the presence of data packets. In order to allow the main receiver/radio of the IoT device to wake up just in time to receive data (rather than being constantly awake), a small receiver may be added that is configured to wake up the main receiver/radio. Such a small receiver may be referred to as a wake-up receiver or wake-up radio (WUR).

In accordance with one aspect of the disclosure, a mechanism to couple dynamic UE capability with UE channel state information (CSI) reporting and with dynamic DCI signaling is described.

As mentioned supra, BWP involves only one aspect related to UE power consumption. In accordance with one aspect, in addition to switching between BWPs for power efficiency, a number of other factors and/or parameters may be considered for power efficiency purposes that may impact UE implementation. For example, one or more of the following factors and/or parameters may be taken into consideration: a maximum rank (e.g., MIMO rank) that can be supported (e.g., a maximum number of multi-user (MU)-MIMO interfering streams UE is expected to handle), a maximum modulation order or MCS that can be supported, a number of UE antennas, a maximum RB allocation (e.g., for a given BWP), a preferred set of PMIs, processing timelines for UE to respond in the given operation mode (e.g., minimum K0, K1, K2 timelines), number of blind decoding (BD) of PDCCH, etc. The RB allocation is different from BW. For example, a UE may handle large BW, but the total number of RBs can be different to make processing feasible for a given clock planning. The minimum processing timelines (e.g. K0, K1, K2) allow the UE time to switch to the given operation mode. For example, K0, the slot offset used for determining the slot where the UE receives PDSCH, or K2, the slot offset used for determining the slot where the UE transmits PUSCH, may either or both be configured to be greater than 0 (or some other value) to allow the UE time to switch before receiving the PDSCH and/or transmitting PUSCH. Similarly, K1, an indicator for the timing between PDSCH and HARQ ACK/NACK feedback, may be configured with a larger value to allow the UE time to switch before transmitting HARQ ACK/NACK.

In one example configuration, a set of parameters including one or more of the above parameters may be associated with a BWP. For example, a first BWP may be associated with a first rank, a first number of antennas, a first MCS, a first minimum processing timeline (K0, K1, or K2), etc., while a second BWP may be associated with a second rank, a second number of antennas, a second MCS, a second minimum processing timeline (K0, K1, or K2), etc. Different such sets of parameters and corresponding different BWPs may be associated with different operation modes supported by the UE. The various different modes may include one or more different power efficient modes that allow low power operation of the UE under given conditions, and one or more spectrum efficient modes that may require the UE to operate in a spectrum efficient manner. The power efficient mode of operation may not be the most spectrum efficient, but allows low power consumption which may be desirable in many cases, especially, when spectrum efficiency may not be critical from the network perspective.

In accordance with one aspect, the base station (e.g., gNB) may configure multiple CSI processes for UE. Traditionally, a UE may report the most spectrum efficient CSI and the base station may schedule data based on the assumption that the UE may operate in a corresponding mode that benefits spectrum efficiency. In one aspect, the UE may also be configured to report a power efficient CSI (e.g., one or more CSI reports determined with different parameters for power efficiency), that may not give the best spectrum efficiency. The UE report of such CSI may be based on assumptions of the UE's own clock frequency, number of receive antennas, MIMO receiver complexity, throughput UE can support, low density parity check (LDPC) decoder iterations, etc., whichever benefits the UE in terms of power efficiency. In some configurations, the power efficient CSI may be determined further based on one or more of the parameters discussed supra (such as a maximum rank, MU-MIMO interfering streams UE is expected to handle, MCS, minimum processing timelines, etc.) associated with power efficient modes/profiles that the UE may support.

In accordance with one aspect, the base station may indicate that the UE may operate in a power efficient mode. The indicated power efficient mode may be associated with the power efficient CSI reported by the UE to the base station, and the indication to operate in the power efficient mode may be based on the power efficient CSI reported by the UE at a given time under a set of operating conditions. The UE may operate accordingly and can be more power efficient when spectrum efficiency is not critical from the network point of view. This may be achieved in a variety of ways. For example, in one configuration the indication may be provided to the UE semi-statically through RRC signaling. In another example, the indication may be included in the DCI (for example, upon DRX/CDRX wakeup). In one such case, the indication for operation mode switch may be achieved via the BWP switch indication in the DCI. For example, a BWP switch indication in DCI may also implicitly indicate an operation mode switch, e.g., to an operation mode that corresponds to the indicated BWP in the DCI.

In yet another example, the indication may be provided to the UE via a power saving signal (e.g., a specific sequence in time and/or frequency domain). The power saving signal may be a special waveform used for WUR detection. The power saving signal may be carried through a power saving signal channel, for example, in a DCI on PDSCH. In the example of a power saving signal, the base station may generate a multi-bit sequence or an encoded codeword (e.g., Zadoff-Chu (ZC) sequences, simplex code, or Reed-Muller (RM) encoded codeword) indicating whether data is expected for the UE, and if data is expected, what configuration/mode is to be used by the UE for receiving and processing the data expected to come during a DRX period. In such a case, one or more bits of the multi-bit sequence may indicate whether or not data is expected, and one or more of the remaining bits may indicate which mode/configuration the UE may use for receiving the data (e.g., upon wake-up). In some configurations, the UE may also be explicitly indicated to use a number of antennas, e.g., for receiving expected data, maximum MIMO rank, max MCS, minimum processing timelines, etc. when operating in a power efficient mode.

When a base station dynamically signals to the UE an indication of the power efficient operation mode, for example, in a DCI or power saving signal as discussed above, the UE may detect and process (e.g., decode) the indication, e.g., a waveform/grant. However, some processing time may be needed between the receipt/processing of the indication at the UE and a point when the UE may start operating in the indicated mode. The time may be needed for the UE to adjust one or more parameters in order to operate in the indicated power efficient mode. For example, this time may be desired by the UE, e.g., to manage/adjust its clock frequency, antenna configuration, etc. to be in the power efficient mode. The time gap between a time of receipt of the indication to the time when the power efficient configuration is assumed by both the base station and UE may depend on the implementation. Some UEs may take a longer time to respond and some may take a shorter time. For some UEs, it may be possible to adapt (e.g., switch to the power efficient configuration) within the same slot in which the indication is received. In some configurations, such a time gap may be signaled (to the base station) as UE capability. The base station may consider the reported time when scheduling data for the UE. In some configurations, a grace period may be needed for switching between different power efficiency modes. Such a grace period may be UE specific (e.g., different for different UEs) and may be based on UE capability. In some configurations, this time grace period may be reported by the UE in UE capability reporting associated with the operation modes.

In one configuration, the power efficiency modes may be pre-configured at the network level. For example, the network may preconfigure one or more power efficient modes/configurations, where each mode/configuration may be associated with a set of parameters. For example, there may be three preconfigured modes/configurations. A first mode/configuration may be associated with a maximum rank=rank4 and a maximum number of RBs=250RBs, a second mode/configuration may be associated with a maximum rank=rank2, and a maximum number of RBs=100RBs, and a third mode/configuration may be associated with a maximum rank=rank1, a maximum number of RBs=20RBs. In one configuration, the network may also multicast this information regarding various preconfigured modes in a SIB, or/and paging signal so that all UEs are aware of such network configuration.

Various additional features are also discussed infra in connection with FIGS. 5-11.

Figure 5:
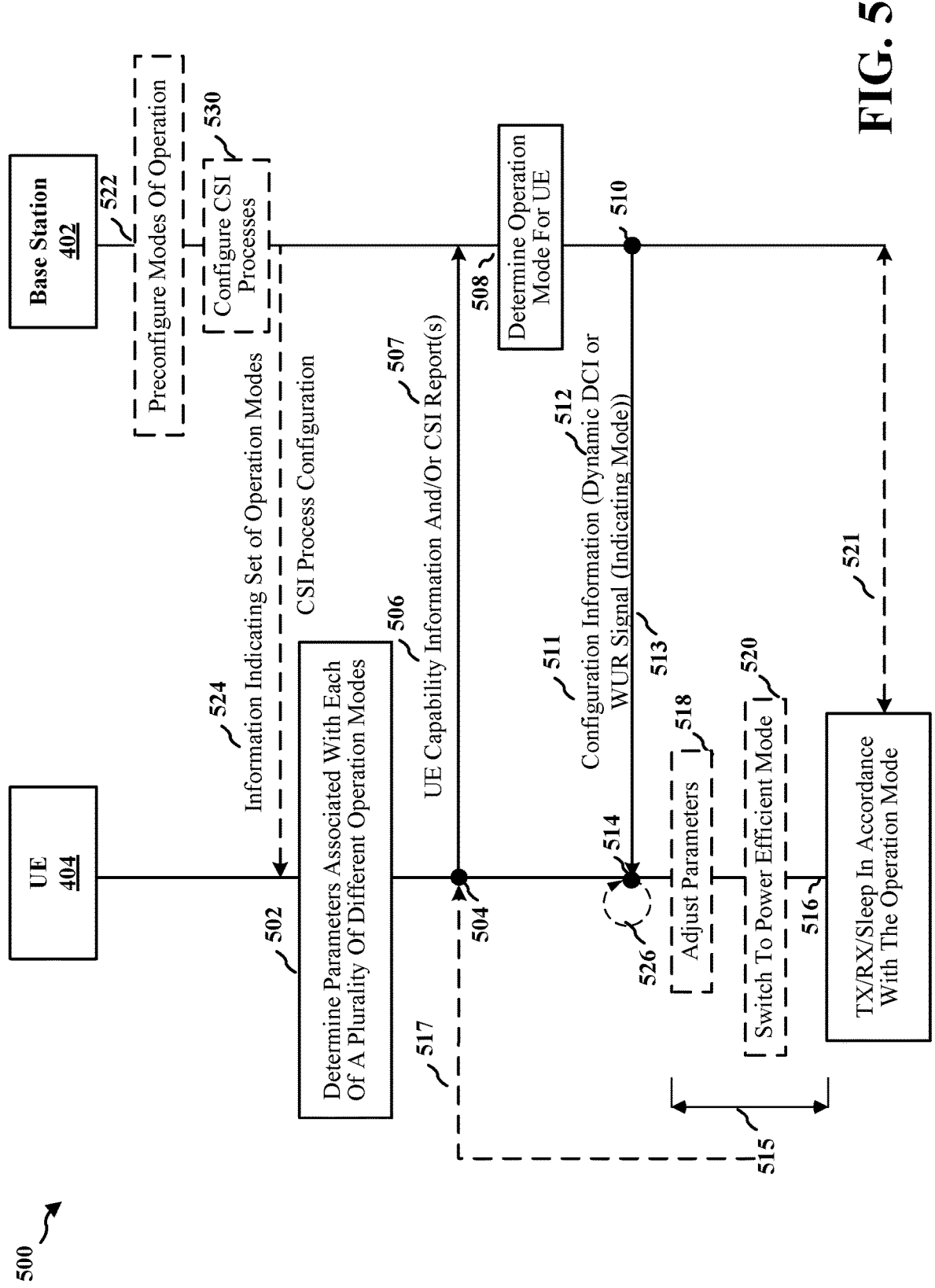
FIG. 5 illustrates an example of communication and signaling exchange between a base station and a UE (e.g., an IoT device), in accordance with certain aspects described herein.

FIG. 5 is a diagram 500 illustrating an example of communication and signaling exchange between the base station 402 (e.g., gNB) and a UE including UE 404, in accordance with one example configuration. The base station 402 and the UE 404 may be a part of the system and access network of FIG. 1. For example, the base station 402 may be the base station 180/102 and the UE 404 may correspond to one of the UEs 104 of FIG. 1. In some configurations, the base station 402 and the UE 404 support and communicate in accordance with the NR standard. In some configurations, the UE 404 may be an IoT type device that supports IoT communications, enhanced machine type communications (eMTC) and/or massive MTC (mMTC) as well as low power operations. Various aspects and features related to power efficient modes/configurations possible for the UE 404 are discussed with reference to FIG. 5.

In the example illustrated in FIG. 5, the UE 404 may inform the base station of UE capability, e.g., with respect to operating in various modes/configurations such as power efficient modes and spectrum efficient modes (and also optionally the time period needed for operation mode switch). Based on the UE capability and optionally on given conditions (e.g., an amount of data intended for the UE 404, network loading, spectrum usage, UE power conservation needs, etc.), the base station 402 may provide an indication to the UE to operate in a power efficient mode or a spectrum efficient mode. For example, a power efficient mode may be a configuration in which the UE may optimize one or more operating parameters to conserve a maximum amount of energy while operating under a set of conditions. A spectrum efficient mode may be a configuration in which the UE may optimize one or more operating parameters to operate in a spectrum efficient manner in order to conserve time and/or frequency communication resources from a network perspective.

As illustrated, at 502 the UE 404 may determine a set of parameters associated with each of a plurality of different operation modes/configurations supported by the UE. For example, a first set of parameters may be associated with a first mode/configuration and a second set of parameters may be associated with a second mode/configuration. The different operation modes/configurations may include at least one power efficient mode/configuration. In accordance with an aspect, the set of parameters associated with a given operation mode (e.g., a power efficient mode) may include one or more of a maximum MIMO rank that can be supported by the UE in the given operation mode, a maximum modulation order or modulation and coding scheme (MCS) (or a different MCS table) that can be supported in the given operation mode, a number of UE antennas that can be used in the given operation mode, a maximum RB allocation desired for the given operation mode, a preferred set of precoding matrix indicators (PMIs), minimum processing timelines for UE to respond in the given operation mode (e.g., any of K0, K1, K2 timelines), a number of blind decoding attempts (BD) of a PDCCH the UE can perform in the given operation mode, or a combination thereof. In some configurations, the set of parameters associated with a given mode may further include other parameters that may impact UE processing timelines and/or power. For example, a first power efficient mode/configuration may correspond to a first set of parameters (including one or more of the above discussed parameters such as rank=1, RB allocation=100, etc.) and a second power efficient mode/configuration may correspond to a second set of parameters (including one or more of the above discussed parameters with different values such as such as rank=4, RB allocation=200, etc.). In some configurations, each set of parameters associated with a corresponding mode/configuration may correspond to a bandwidth part (BWP) configured by the base station 402. With each different set of parameters, a different power efficient profile of the UE may be achieved for low power operations. While the power efficient modes may not necessarily be spectrum efficient, the network (e.g., base station 402) may allow the UE to operate in low power mode (even at cost of higher spectrum usage) when spectrum efficiency in not critical and/or power efficiency is more desirable.

At 504, the UE 404 may transmit UE capability information 506 including the determined set of parameters (discussed supra) for each of the plurality of different modes to the base station 402. In some configurations, the transmission may further include an indication of each of the different modes (corresponding to the determined set of parameters). In some configurations, the transmission may further include one or more CSI reports 507 (including at least one power efficient channel state information) determined by the UE 404 in one or more corresponding power efficient modes. For example, the UE 404 may temporarily adjust one or more parameters to be in power efficient mode, determine the CSI while being in the power efficient mode, and report the determined CSI (referred to as the power efficient CSI) to the base station 402. In some configurations, a power efficient CSI may be determined based on an assumption by the UE 404 of one or more of: a clock frequency used by the UE in a power efficient mode, a number of receive antennas used in the power efficient mode, MIMO receiver complexity supported in the power efficient mode, a throughput that the UE can support in the power efficient mode, a number of decoder iterations that the UE can perform in the power efficient mode, etc. In some configurations, the power efficient CSI may be determined further based on one or more of the parameters discussed supra (such as a maximum rank, MU-MIMO interfering streams UE is expected to handle, MCS, minimum processing timelines, etc.) associated with power efficient modes/profiles that the UE may support. In some configurations, the power efficient CSI may be associated with the UE capability information discussed above. In some other configurations, the power efficient CSI may be reported separately and independently of the UE capability information.

In accordance with one aspect, based on the UE capability information, at 508 the base station 402 may determine that the UE 404 may operate in a certain mode out of the various different modes supported by the UE. For example, the base station may determine that the UE may operate in a power efficient mode, e.g., based on the information received from the UE 404 (e.g., the set(s) of parameters corresponding to modes supported by the UE 404 and/or CSI report(s) corresponding to different modes). The base station may then indicate to the UE the mode to be used by the UE out of the different modes supported by the UE. The indication of the mode to be used by the UE (e.g. a power efficient mode) may be based on a power efficient CSI reported by the UE. For example, the power efficient mode may be associated with the power efficient CSI reported by the UE 404 to the base station 402, and the indication to operate in the power efficient mode may be based on the power efficient CSI reported by the UE 404 at a given time under a set of operating conditions.

At 510 the base station 402 may transmit configuration information 511 based on the UE capability information 506 which dynamically indicates (e.g., for example, via DCI 512 or a WUR signal 513) that the UE 404 may operate in the power efficient mode. The indication from the base station 402 may allow the UE 404 to operate accordingly and thus be more power efficient. In some configurations, such an indication to use a power efficient mode may be provided when spectrum efficiency is not critical from the network point of view and power efficiency for the UE 404 is more desirable. The indication may be provided in a variety of ways. For example, in one configuration the indication may be provided to the UE 404 semi-statically through RRC signaling. In another example, the indication may be included in a DCI (for example, upon DRX/CDRX wakeup) transmitted from the base station 402. In yet another example, the indication may be provided to the UE 404 via a power saving signal. The power saving signal may be provided through a power saving signal channel, for example in DCI of PDSCH. In one example, the power saving signal may be a special waveform (e.g., a specific sequence in time and/or frequency domain) for WUR detection. In the example of the special waveform/sequence, the base station 402 may generate a multi-bit sequence or an encoded codeword (e.g., ZC sequences, simplex code, or Reed-Muller (RM) encoded codeword) indicating whether data is expected for the UE 404, and if data is expected, what configuration/mode/CSI process is to be used by the UE 404 for receiving and processing the data expected to come during a DRx period. In some configurations, the UE 404 may also be explicitly indicated to use a specified number of antennas, e.g., for receiving the expected data, when operating in a power efficient mode.

At 514, the UE 404 may receive and process (e.g., decode) the configuration information 511 including the indication (e.g., in the DCI/waveform) from the base station 402. However, some processing time may be associated with the receipt/processing of the indication at the UE 404. Thus, there may be a time gap 515 between the receipt/processing of the indication at the UE (at 514) and the time when the UE may start operating in the indicated mode (at 516). For example, the time gap 515 may correspond to a time period for the UE 404 to adjust one or more parameters to start operating in the indicated power efficient mode (at 518) and/or switch to or between power efficient modes (at 520). For example, this time may be desired by the UE 404, e.g., to manage/adjust its clock frequency, antenna configuration, etc. to be in the power efficient mode. The time gap between a time of receipt of the indication to the time when the power efficient configuration is assumed by both the base station 402 and UE 404 may depend on the implementation. Some UEs may take a longer time to respond and some may take a shorter time. For some UEs, it may be possible to adapt (e.g., switch to the power efficient configuration) within the same slot in which the indication is received. In some configurations, such a time gap 515 may be signaled (to the base station 402 as depicted by arrow 517) as UE capability (e.g. in UE capability information 506). The base station 402 may consider the reported time when scheduling data 521 for the UE 404. In some configurations, the time gap 515 may be a grace period needed for switching between different power efficiency modes (e.g., from a first power efficient mode based on a first set of operating parameters to a second power efficient mode based on a second set of operating parameters). Such a grace period may be UE specific (e.g., different for different UEs) and may be based on UE capability. In some configurations, the grace period associated with switching between different modes may also be indicated by the UE to the base station 402, for example, in UE capability information.

After the processing and adjustment time, at 516, the UE 404 may start operating in the power efficient mode. In various configurations, operating in the power efficient mode may comprise operating in a manner that allows relatively lower power consumption at the UE 404 and may include one or more of transmitting, receiving, or sleeping in accordance with the power efficient mode, e.g., with one or more operational parameters adjusted for the power efficient mode. For example, the base station 402 and UE 404 may transmit and receive data 521 while the UE is operating in the power efficient mode.

In one configuration, the power efficiency modes may be pre-configured at the network level. For example, at 522, the network (e.g. base station 402) may preconfigure one or more power efficient modes/configurations, where each mode/configuration may be associated with a set of parameters. For example, there may be three preconfigured modes/configurations. A first mode/configuration may be associated with a maximum rank=rank4 and a maximum number of RBs=250RBs, a second mode/configuration may be associated with a maximum rank=rank2, and a maximum number of RBs=100RBs, and a third mode/configuration may be associated with a maximum rank=rank1, a maximum number of RBs=20RBs. The modes may be preconfigured with other parameters (for example, MCS, minimum processing timelines, etc.). In one configuration, the network may also multicast this information 524 regarding various preconfigured modes in a SIB, or/and paging signal so that all UEs are aware of such network configuration. The UE may select (at 526) a mode of operation from the preconfigured modes and/or from the indicated mode received from the base station (at 514).

In some aspects, when the UE 404 sends CSI reports 507 to the base station 402, the UE may report a plurality of CSIs each corresponding to one of the different operation modes. The plurality of CSIs may include the power efficient CSI (e.g., one or more CSIs determined with one or more parameters selected to maximize energy efficiency and reduce power consumption) as well as a spectrum efficient CSI (e.g. one or more CSIs determined with one or more parameters selected by the UE to conserve time and/or frequency resources). The UE may report the CSI in response to receiving (e.g. at 528) a configuration (e.g. at 530) from the base station for a plurality of CSI processes. One CSI process may be based on spectrum efficiency, while another CSI process may be based on power efficiency, for example.

Figure 6:
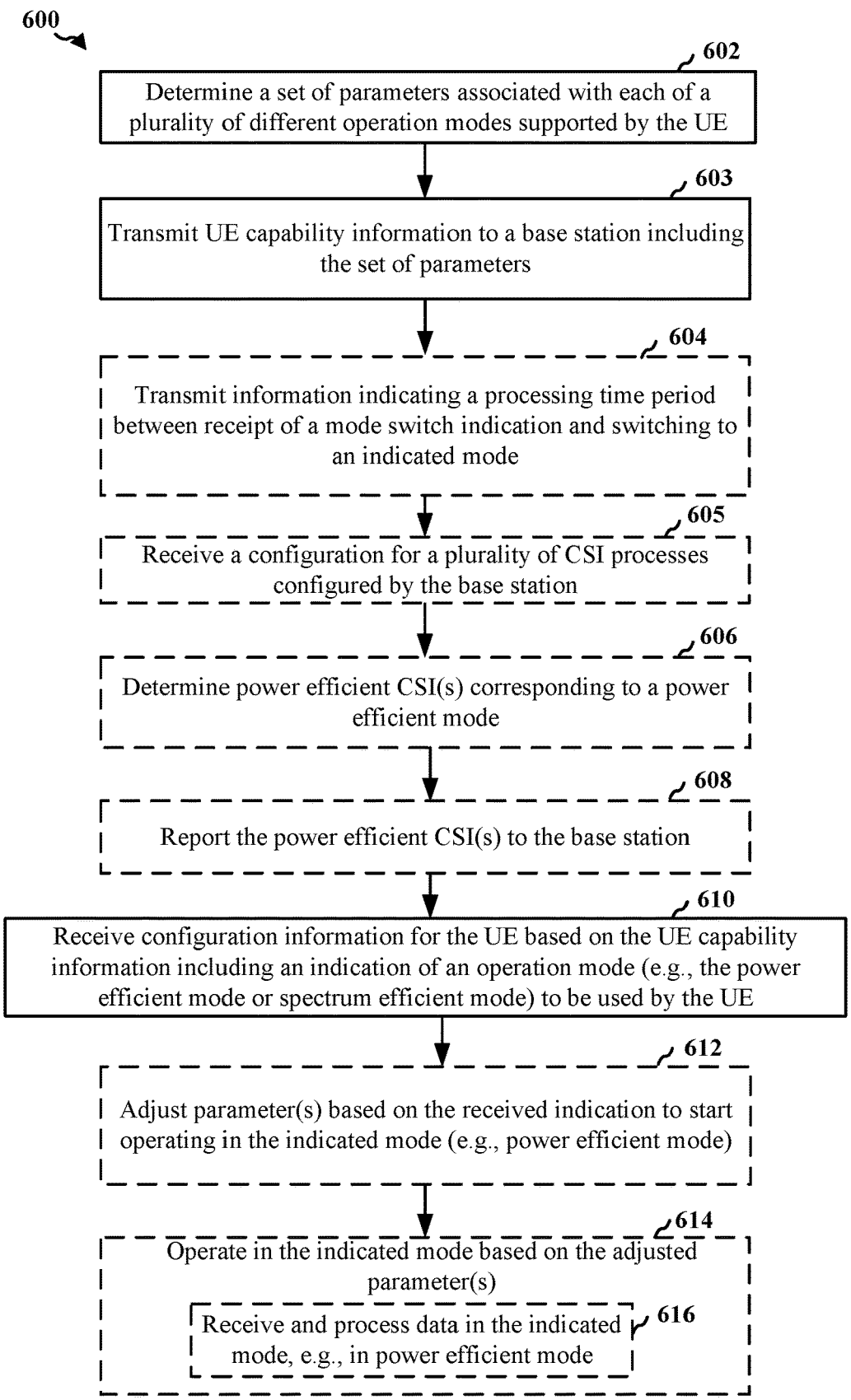
FIG. 6 is a flowchart of a method of wireless communication of a UE.

FIG. 6 is a flowchart 600 of an example method of wireless communication in accordance with aspects presented herein. The method may be performed by a UE (e.g., UE 104, 350, 404, the apparatus 702/702', the processing system 814, which may include the memory 360 and which may be the entire UE 350 or a component of the UE 350, such as the TX processor 368, the RX processor 356, and/or the controller/processor 359). Optional aspects are illustrated in dashed lines.

At 602, the UE may determine a set of parameters associated with each of a plurality of different operation modes supported by the UE. For example, 602 may be performed by determination component 706 of FIG. 7. At least one of the plurality of different operation modes comprises a power efficient mode. For example, as discussed supra in connection with FIG. 5, the UE 404 may support power efficient modes and spectrum efficient modes. In accordance with an aspect, the set of parameters associated with a given operation mode may include one or more of a maximum MIMO rank that can be supported by the UE in the given operation mode, a maximum modulation order or modulation and coding scheme (MCS) (or a different MCS table supported by the UE in the given mode which may be different than an MCS table used in another mode) that can be supported in the given operation mode, a number of UE antennas that can be used in the given operation mode, a maximum RB allocation desired for the given operation mode, a preferred set of PMIs, minimum processing timelines for UE to respond in the given operation mode (e.g., any of K0, K1, K2 timelines), a number of BD of a PDCCH the UE can perform in the given operation mode, or a combination thereof. For example, the set of parameters may include a minimum processing timeline based on one of K0, K1, or K2. In another example, the set of parameters may include a minimum processing timeline based on K0 and K2. In another example, the set of parameters may include a minimum processing timeline based on K0, K1, and K2. These are merely examples to illustrate the concept. Different combinations of minimum processing timelines may be comprised in the set of parameters. In some configurations, the set of parameters associated with a given mode may further include other parameters that may impact UE processing timeline and/or power. For example, a first power efficient mode/configuration may correspond to a first set of parameters (including one or more of the above discussed parameters such as rank=1, RB allocation=100, etc.) and a second power efficient mode/configuration may correspond to a second set of parameters (including one or more of the above discussed parameters with different values such as such as rank=4, RB allocation=200, etc.). In some configurations, each set of parameters associated with a corresponding mode/configuration may correspond to a BWP configured by the base station 402. For example, each of the plurality of different operation modes may be associated with a different one of a plurality of different BWPs. An individual set of parameters corresponding to an individual operation mode may be associated with a corresponding BWP of the plurality of different BWPs. In one configuration, the plurality of different BWPs may be configured by the base station 402 and correspond to different power efficient modes supported by the UE 404. From a different perspective, a BWP may be another parameter in the set of parameters corresponding to a mode/configuration.

At 603, the UE may transmit UE capability information including the determined set of parameters for each of the plurality of different modes to the base station. For example, 603 may be performed by determination component 706 of FIG. 7. For example, with reference to FIG. 5, the UE 404 may transmit the determined set of parameters (e.g. in UE capability information 506) for each of the plurality of different modes to the base station 402. In some configurations, the transmission may further include an indication of each of the different modes (corresponding to the determined set of parameters).

At 604, the UE may transmit information indicating the processing time period to the base station as part of the UE capability information. For example, 604 may be performed by operation control component 714 of FIG. 7. As discussed supra with respect to FIG. 5, some processing time may be associated with the receipt/processing of an indication for operation mode switch at the UE, and there may be a time gap (e.g. time gap 515) between the receipt/processing of such an indication at the UE and the time when the UE may start operating in the indicated mode. For example, the time gap may correspond to a time period for the UE to adjust one or more parameters to start operating in the indicated power efficient mode after having received the indication. For example, this time may be desired by the UE 404, e.g., to manage/adjust its clock frequency, antenna configuration, etc. to be in the power efficient mode. The time gap may depend on the UE implementation and/or UE type. Some UEs may take a longer time to respond and some may take a shorter time. For some UEs, it may be possible to adapt (e.g., switch to the power efficient configuration) within the same slot in which the indication is received. In some configurations, it may be desired to signal such a time gap to the base station. Accordingly, in one configuration, at 604 the UE may transmit information indicating a processing time period between receipt of the indication and switching to the indicated mode (e.g., power efficient mode) to the base station. The base station 402 may consider the reported time period when scheduling data for the UE 404. In some configurations, a time period associated with switching between different modes supported by the UE may be indicated to the base station 402, e.g., as part of the UE capability information (step 604) or separately. Thus, in some configurations, the processing time needed from reception of an operation mode indication to when the operation mode is switched to the newly indicated operation mode may be reported by the UE in the UE capability information. In some configurations, the time gap may be a grace period needed for the UE to switch between different power efficiency modes.

In accordance with one aspect, the base station may configure multiple CSI processes for UE. For example, the base station may configure a spectrum efficient CSI process and one or more power efficient CSI processes. In such an aspect, at 605, the UE may receive a configuration for a plurality of CSI processes (e.g., one or more power efficient CSI processes corresponding to one or more power efficient modes and one or more spectrum efficient CSI processes corresponding to one or more spectrum efficient modes) from the base station. For example, 605 may be performed by CSI component 710 of FIG. 7. Through such configuration, the base station may configure the UE to report a power efficient CSI in addition to a spectrum efficient CSI. Thus, in various configurations, the UE may report at least power efficient CSI (e.g., one or more CSIs determined with one or more parameters selected to maximize energy efficiency and reduce power consumption) and/or at least one spectrum efficient CSI to the base station.

Accordingly, at 606, the UE may determine at least one power efficient CSI corresponding to a power efficient mode. For example, 606 may be performed by CSI component 710 of FIG. 7. For example, with reference to FIG. 5, the UE 404 may temporarily adjust one or more parameters to be in a power efficient mode, determine the CSI while being in the power efficient mode, and report the determined CSI (referred to as the power efficient CSI) to the base station 402. In some configurations, a power efficient CSI may be determined based on one or more of: a clock frequency used by the UE in a power efficient mode, a number of receive antennas used in the power efficient mode, MIMO receiver complexity supported in the power efficient mode, a throughput that the UE can support in the power efficient mode, a number of decoder (e.g., LDPC decoder) iterations that the UE can perform in the power efficient mode, and/or other such parameters that may benefit the UE in terms of power efficiency. The UE may set these parameters at values suitable for low or ultra power consumption, measure reference signals for channel estimation with set parameter values to estimate the channel conditions and determine channel quality information or CSI for such a power efficient mode. In some configurations, the power efficient CSI may be determined further based on one or more of the parameters discussed supra (such as a maximum rank, MU-MIMO interfering streams UE is expected to handle, MCS, etc.) associated with power efficient modes/profiles that the UE may support. In a similar manner, other CSI reports corresponding to operation modes for different spectrum efficiency and power efficiency tradeoffs may be determined based on the above discussed criteria as well, and reported to the base station as desired.

At 608, the UE may report the at least one power efficient CSI to the base station. For example, 608 may be performed by CSI component 710 of FIG. 7. In some configurations, the power efficient CSI may be reported with the UE capability information discussed above in connection with step 603. In some other configurations, the power efficient CSI may be reported separately and independent of the UE capability information. In some configurations, more than one power efficient CSI report may be transmitted to the base station corresponding to different power efficient modes. In some configurations, with each power efficient or spectrum efficient CSI report, a corresponding metric of spectrum efficiency (e.g., CQI) may also be indicated to allow the base station to understand how different are the different supported power efficient modes is in terms of spectrum efficiency.

At 610, the UE may receive configuration information for the UE including an indication of an operation mode of the plurality of different operation modes to be used by the UE (e.g., at a given time) based on the UE capability information and/or the CSI reports corresponding to the different supported modes sent by the base station to the UE. For example, 610 may be performed by processing component 708 of FIG. 7. For example, the indication may inform the UE that the UE may operate in a power efficient mode or a spectrum efficient mode. When the indication allows operating in a power efficient configuration, the UE 404 may operate accordingly and thus be more power efficient. In some configurations, the indication to operate in a power efficient mode may be provided when spectrum efficiency is not critical from the network point of view and power efficiency for the UE 404 is more desirable. For example, based on the reported UE capability information including the sets of parameters and corresponding different supported modes of operation that may that achieve different spectrum efficiency and power efficiency tradeoffs and/or the CSI reports corresponding to the different supported modes of operation, the base station may decide which mode/configuration may be used by the UE at the given time and conditions. For example, under low network loading conditions where spectrum efficiency is not critical from the network perspective, the base station may indicate that the UE may operate in a power efficient (out of multiple possible power efficient modes and spectrum efficient modes) mode. Under certain other conditions and time (e.g., when spectrum efficiency is important) the base station may indicate that the UE should operate in spectrum efficient mode. For example, when a large number of devices need to be scheduled for data and intensive spectrum usage is expected by the base, the base station may make a decision if a power efficient mode can be selected for the UE or a spectrum efficient mode needs to be used. For example, based on a power efficient CSI report and a spectrum efficient CSI report the base station may determine that at a given time and conditions, a power efficient mode is wasteful in terms of spectrum usage, and the base station may not allow the UE to operate in the power efficient mode and the indication from the base station (at 610) may indicate that the UE should operate in the spectrum efficient mode for operation (e.g., for receiving and processing scheduled data for the UE).

The indication may be dynamic and may be provided in a variety of ways. For example, in one configuration, the indication may be provided to the UE, e.g., semi-statically through RRC signaling, or in the DCI (for example, upon DRx/CDRx wakeup), or via a special waveform such as a power saving signal (e.g., a specific sequence in time and/or frequency domain) or through a power saving signal channel. In one example case where the indication may be provided via the special waveform/sequence, the base station may generate a multi-bit sequence or an encoded codeword (e.g., ZC sequences, simplex code, or Reed-Muller (RM) encoded codeword) indicating whether data is expected for the UE, and if data is expected, what configuration/mode is to be used by the UE 404 for receiving and processing the data expected to come. In some configurations, the UE 404 may also be explicitly indicated to use a specified number of antennas, e.g., for receiving the expected data, when operating in an indicated mode (power efficient mode or spectrum efficient mode).

At 612, the UE may adjust one or more parameters based on the received indication to start operating in the indicated mode. For example, 612 may be performed by adjustment component 712 of FIG. 7. For discussion purposes, assuming that the indication indicates the UE should operate in the power efficient mode, the UE may adjust parameters (e.g., clock frequency, rank, MCS, number of antennas, etc.) so that the UE can operate in the power efficient mode.

At 614, the UE may operate in the indicated mode based on the adjusted one or more parameters. For example, 614 may be performed by operation mode control component 714 of FIG. 7. For example, if the indicated mode is the power efficient mode, the UE may start operating in the power efficient mode. If the indicated mode is the spectrum efficient mode, the UE may start operating in the spectrum efficient mode. In various configurations, operating in the indicated mode may comprise one or more of transmitting, receiving, sleeping in accordance with the indicated mode, e.g., with one or more operational parameters adjusted for the indicated efficient mode. Assuming that the indicated mode is the power efficient mode and there is scheduled incoming data for the UE, at 616, the UE may receive and process the data from the base station in the power efficient mode. For example, 616 may be performed by operation mode control component 714 of FIG. 7.

In one aspect, various power efficiency modes may be pre-configured at the network level. For example, the network may pre-configure one or more power efficient modes/configurations, where each mode/configuration may be associated with a set of parameters (e.g., rank, number of RBs, MCS, etc.). For example, there may be three preconfigured power efficiency modes/configurations: a first mode/configuration may be associated with a maximum rank=rank4 and a maximum number of RBs=250RBs, a second mode/configuration may be associated with a maximum rank=rank2, and a maximum number of RBs=100RBs, and a third mode/configuration may be associated with a maximum rank=rank1, a maximum number of RBs=20RBs. In such an example, the UE may be aware (e.g., because of pre-configuration) of the various power efficiency modes and may request to use on the pre-configured power efficiency modes at a given time. If the base station, determines that at the given time and given conditions, it may be feasible to allow the UE to use the requested mode, the base station may send an indication (e.g., such as the indication discussed above with respect to step 610) allowing the UE to operate in the requested mode. When the use of the requested mode is not suitable from the network perspective (e.g., because of poor spectrum efficiency and/or other reasoning/conditions at a given time), the base station may either send an indication denying the use of requested mode, or indicating a different mode to be used instead. Alternatively, no explicit indication or signaling may be sent to the UE in response to the request, rather the UE may configured to use a default spectrum efficient mode when no indication is received in response to the request from the UE. In some configurations, the network (e.g., base station 402) may multicast this information regarding various preconfigured modes in a SIB, or/and paging signal so that all UEs are aware of such network configuration.

Figure 7:
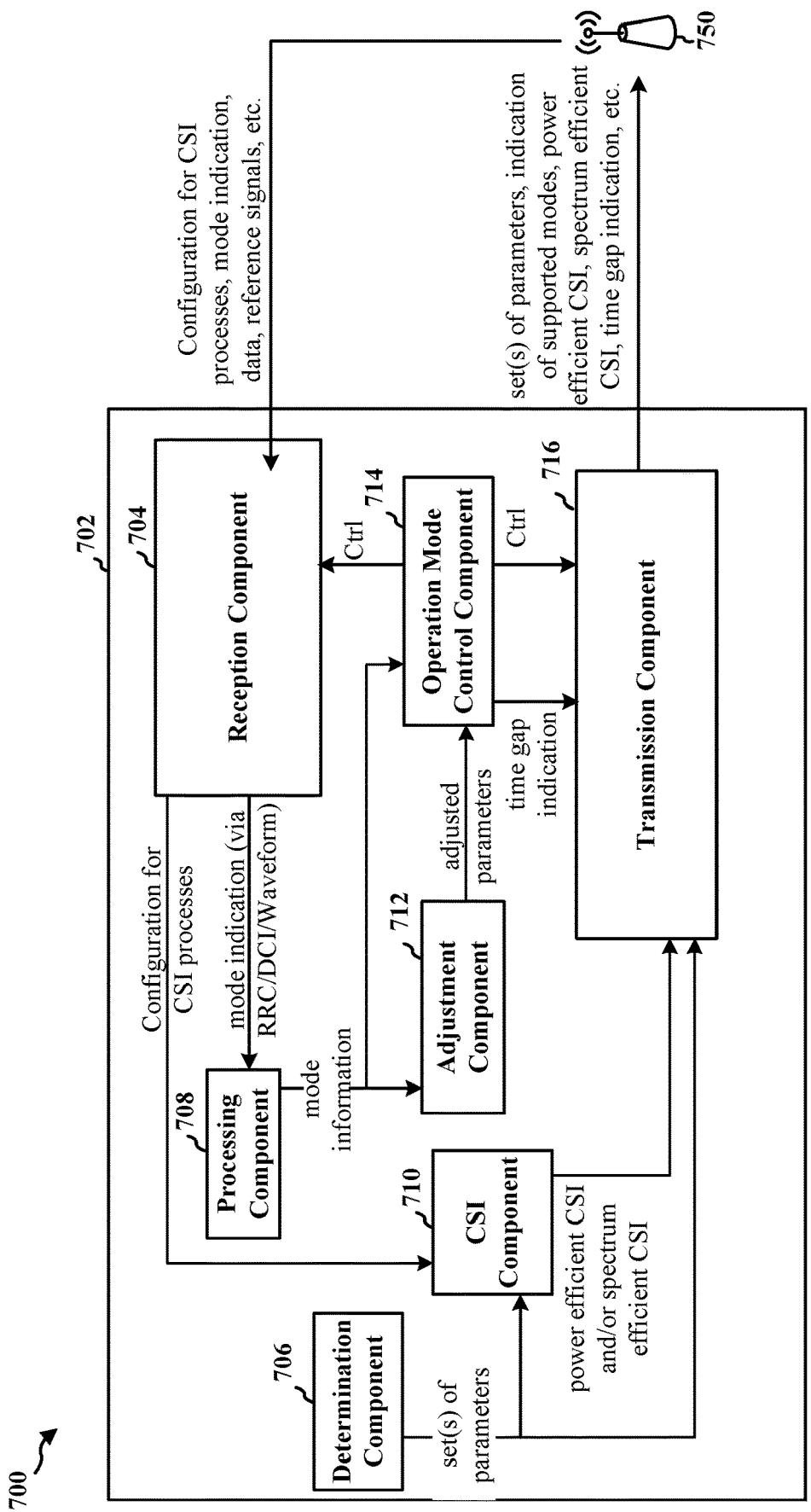
FIG. 7 is a conceptual data flow diagram illustrating the data flow between different means/components in an example apparatus, e.g., a UE.

FIG. 7 is a conceptual data flow diagram 700 illustrating the data flow between different means/components in an example apparatus 702. The apparatus 702 may be a UE or a component of a UE (e.g., such as UE 104, 350, 404, 1050). The apparatus 702 may include a reception component 704, a determination component 706, a processing component 708, a CSI component 710, an adjustment component 712, an operation mode control component 714, and a transmission component 716.

The reception component 704 may be configured to receive signals and/or other information from other devices including, e.g., base station 750. The signals/information received by the reception component 704 may be provided to one or more components of the apparatus 702 for further processing and use in performing various operations in accordance with the methods discussed supra including the method of flowchart 600. Thus, via the reception component 704, the apparatus 702 and/or one or more components therein receive signals and/or other information (e.g., such as data for the apparatus 702, configuration for CSI processes, DCI, WUR indication and/or other control signaling) from the base station 750 as discussed supra and also discussed more specifically infra.

The determination component 706 may be configured to determine a set of parameters associated with each of a plurality of different operation modes supported by the apparatus 702, e.g., as described in connection with step 602 of FIG. 6. As discussed supra, the different operation modes/configurations may include at least one power efficient mode/configuration. In an aspect, the set of parameters associated with a given operation mode (e.g., a power efficient mode) may comprise one or more may include one or more of a maximum rank that can be supported by the UE in the given operation mode, a maximum modulation order or MCS that can be supported in the given operation mode, a number of UE antennas that can be used in the given operation mode, a maximum RB allocation desired for the given operation mode, a preferred set of PMIs, minimum processing timelines for UE to respond in the given operation mode (e.g., K0, K1, K2 timelines), a number of BD of a PDCCH the UE can perform in the given operation mode, or a combination thereof.

In one configuration, the determination component 706 may be further configured to transmit (e.g., via the transmission component 716) UE capability information including the (determined) set of parameters and the plurality of different operation modes supported by the UE to the base station 750, e.g., as described in connection with step 603 of FIG. 6.

In one configuration, the processing component 708 may be configured to receive (e.g., via the reception component 704 from the base station 750) configuration information for the UE including an indication of an operation mode of the plurality of different operation modes to be used by the apparatus 702 based on the UE capability information, e.g., as described in connection with step 610 of FIG. 6. In some configurations, the indication may be received, e.g., semi-statically through an RRC signal from the base station 750. In one configuration, the indication may be received in DCI from the base station 750. In one configuration, the indication may be received from the base station 750 through a waveform sequence designed for WU) detection. The processing component 708 may process and recover the received indication and provide operation mode related information or instructions to the adjustment component 712 and the operation mode control component 714.

The CSI component 710 may be configured to receive (e.g., via the reception component 704) a configuration for CSI processes from the base station 750, e.g., as described in connection with step 605 of FIG. 6. The configuration may instruct the apparatus 702 to report one or more types of CSI reports to the base station 750. The CSI component 710 may be further configured to generate the one or more CSI reports in accordance with the methods and aspects discussed supra. For example, the CSI component 710 may be configured to determine at least one power efficient CSI and at least one spectrum efficient CSI, e.g., as described in connection with step 606 of FIG. 6. In one configuration, the at least one power efficient CSI may correspond to a power efficient mode (e.g., CSI determined when operating in a power efficient mode based on one or more parameters that benefit the UE from a low power consumption perspective). For example, in one configuration, a power efficient CSI may be based on one or more of a clock frequency, a number of receive antennas, MIMO receiver complexity, throughput that can be supported, decoder iterations, etc., that allows power efficient mode operation at the apparatus 702 and benefits the apparatus 702 in terms of power efficiency. In some configurations, the at least one power efficient CSI may be determined further based on one or more of the other parameters discussed supra (such as a maximum rank, MCS, etc.) associated with power efficient modes/profiles that the apparatus 702 may support. In one configuration, the at least one spectrum efficient CSI may correspond to a spectrum efficient mode (e.g., CSI determined when operating in a spectrum efficient mode based on one or more parameters set for spectrum efficient mode of operation). In various configurations, the CSI component 710 may be further configured to report (e.g., via the transmission component 716) the at least one power efficient CSI and the at least one spectrum efficient CSI to the base station, e.g., as described in connection with step 608 of FIG. 6.

In some configurations, the received indication of the mode of the plurality of different operation modes to be used by the apparatus 702 may be further based on the at least one power efficient CSI reported by the apparatus 702, and the indicated mode may be a power efficient mode. For example, the indicated power efficient mode may correspond to the at least one CSI and be based on the parameters used to calculate the at least one CSI.

The adjustment component 712 may be configured to adjust one or more parameters based on the received indication to start operating in an indicated mode, e.g., a power efficient mode or the spectrum efficient mode, e.g., as described in connection with step 612 of FIG. 6. For example, in one configuration, the indication from the base station 750 may indicate that the apparatus 702 may operate in the power efficient mode. In such an example, the adjustment component 712 may be configured to adjust one or more parameters (e.g., setting parameter values) that correspond to the power efficient mode of operation. The operation mode control component 714 may be configured to control the apparatus 702 to operate in the mode indicated in the received indication (e.g., power efficient mode or spectrum efficient mode) based on the adjusted one or more parameters, e.g., as described in connection with step 614 of FIG. 6. For example, if the received indication is for a power efficient mode, the operation mode control component 714 may control the apparatus 702 (and the components therein) to operate in the power efficient mode and control one or more components (e.g., reception component 704, transmission component 716 and/or other components) to function in a manner to conserve energy as discussed supra. In some other configurations, various different modes of operation that may be used by the apparatus 702 (e.g., in which the apparatus 702 may operate) may be preconfigured by the base station 750. In some such configurations, the operation mode control component 714 may be configured to select a mode of operation from a set of preconfigured modes of operation. The different operation modes supported by the apparatus 702 may include a subset of the preconfigured modes of operation. In some such configurations, the operation mode control component 714 may be further configured to transmit (e.g., via the transmission component 716) an indication of the selected mode to the base station 750, and receive a confirmation whether the apparatus 702 is allowed or not allowed to use the selected mode.

The operation mode control component 714 may be configured to receive and process data in the indicated mode, e.g., in the power efficient mode, e.g., as described in connection with step 616 of FIG. 6. The operation mode control component 714 may control the device to perform DRx/CDRx, go to sleep mode, wake-up in accordance with a current mode of operation, control Tx/Rx circuitry (e.g., components 704/716) in accordance with the current mode of operation, e.g., control sleep, wake-up and/or related operations of the Tx/Rx circuitry.

In some configurations, the operation mode control component 714 may be further configured to determine a processing time period between the receipt of the indication and switching to an indicated mode (e.g., switching from a current mode to a power efficient mode or spectrum efficient based on indication). The determination may be based on the UE capability with respect to processing the received indication, adjusting one or more parameters, and starting to operate in the new mode). In some such configurations, the operation mode control component 714 may be further configured to transmit (e.g., via the transmission component 716) an indication of the processing time period between the receipt of the indication and starting of operation in the indicated mode, e.g., as described in connection with step 604 of FIG. 6. In one configuration, the indication may be transmitted as part of UE capability information. In some configurations, the adjustment component 712 and the operation mode control component 714 may be individually separate components as shown or may be implemented as a single component.

The transmission component 716 may be configured to transmit various messages to one or more external devices, e.g., including the base station 750, in accordance with the methods disclosed herein. The messages/signals to be transmitted may be generated by one or more other components as discussed above, or the messages/signals to be transmitted may be generated by the transmission component 716 under the direction/control of the one or more other components discussed supra. Thus, in various configurations, via the transmission component 716, the apparatus 702 and/or one or more components therein transmit signals and/or other information (e.g., such as the determined set(s) of parameters, supported modes of operation, various determined CSI reports indicating power efficient CSI and/or spectrum efficient CSI, processing time gap indication, etc.), control messages and/or other signals) to external devices such as the base station 750.

The apparatus 702 may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
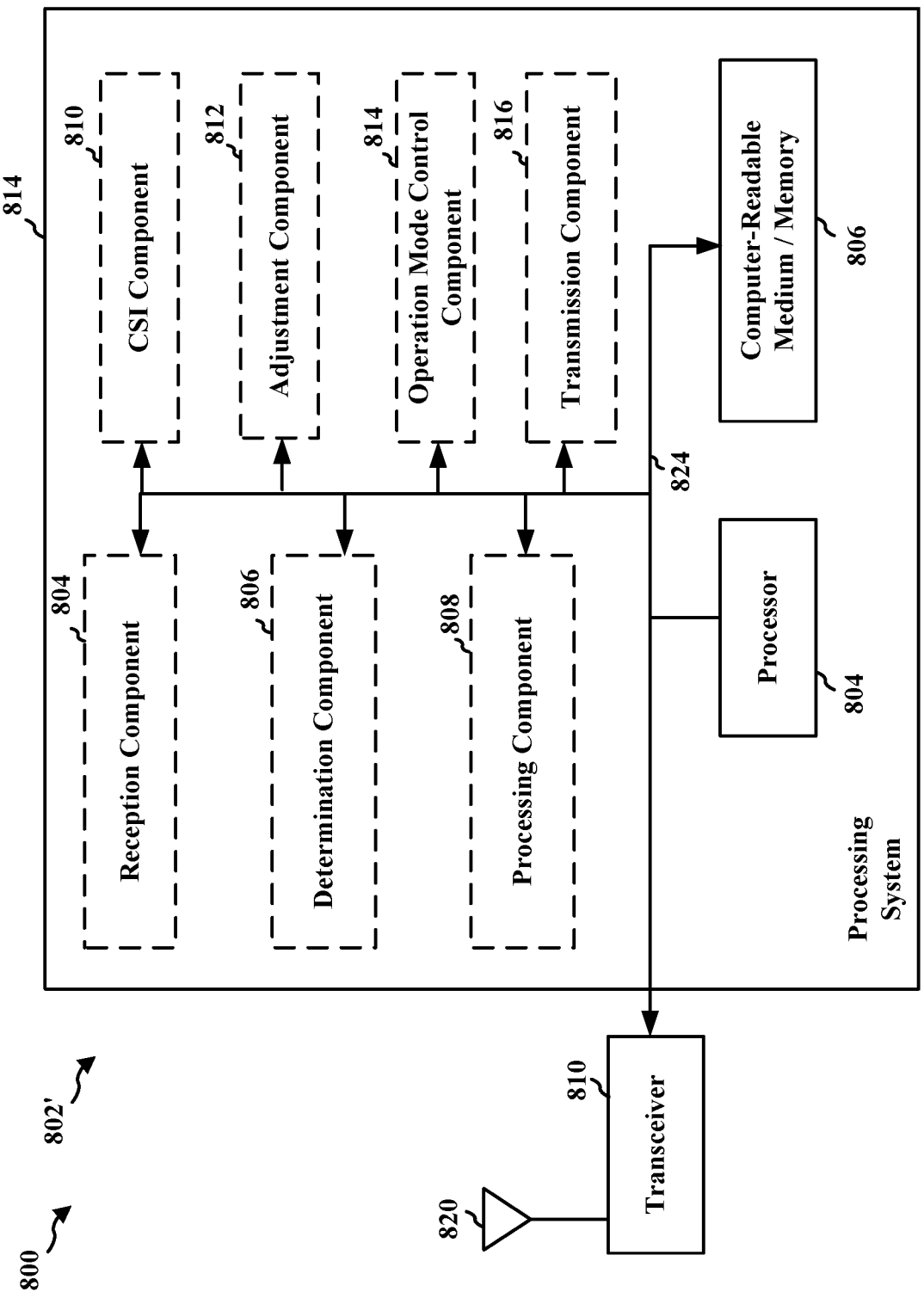
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 716, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716. The components may be software components running in the processor 804, resident/stored in the computer-readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' is a UE for wireless communication including means for performing the aspects described in connection with FIGS. 5 and 6. For example, in one configuration, the UE may comprise means for determining a set of parameters associated with each of a plurality of different operation modes supported by the UE, wherein at least one of the plurality of different operation modes comprises a power efficient mode. In one configuration, the UE may further comprise means for transmitting UE capability information to a base station, the capability information including the set of parameters. In one configuration, the UE may further comprise means for receiving configuration information for the UE based on the UE capability information, the configuration information including an indication of an operation mode of the plurality of different operation modes.

In one configuration, the UE may further comprise means for reporting at least one power efficient CSI to the base station, the at least one power efficient CSI corresponding to the power efficient mode. In one configuration, the at least one power efficient CSI is determined based on one or more of: a clock frequency used by the UE in the power efficient mode, a number of receive antennas used in the power efficient mode, MIMO receiver complexity supported in the power efficient mode, a throughput that the UE can support in the power efficient mode, a number of decoder iterations that the UE can perform in the power efficient mode, or a combination thereof. In some configurations, the indication of the mode of the plurality of different operation modes to be used by the UE is received further based on the at least one power efficient CSI reported by the UE, and wherein the mode is a power efficient mode. In some configurations, the indication is received via one of: semi-statically through a RRC signal, in DCI, or through a waveform sequence such as via a power saving signal or through a power saving signal channel.

In some configurations, the UE may further comprise means for adjusting one or more parameters based on the received indication to start operating in the operation mode, wherein the operation mode is the power efficient mode. In some configurations, the UE may further comprise means for operating in the power efficient mode based on the one or more parameters adjusted based on the indication. In some configurations, a processing time period between the receipt of the indication and switching to the power efficient mode is based on UE capability. In some such configurations, the UE may further comprise means for transmitting information indicating the processing time period to the base station.

In some configurations, the UE may further comprise means for receiving a configuration from the base station for a plurality of CSI processes, wherein a first CSI process is based on spectrum efficiency and a second CSI process is based on power efficiency. In one configuration, the UE may further comprise means for selecting a mode of operation from a set of preconfigured modes of operation, wherein the different operation modes supported by the UE comprise a subset of the preconfigured modes of operation.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
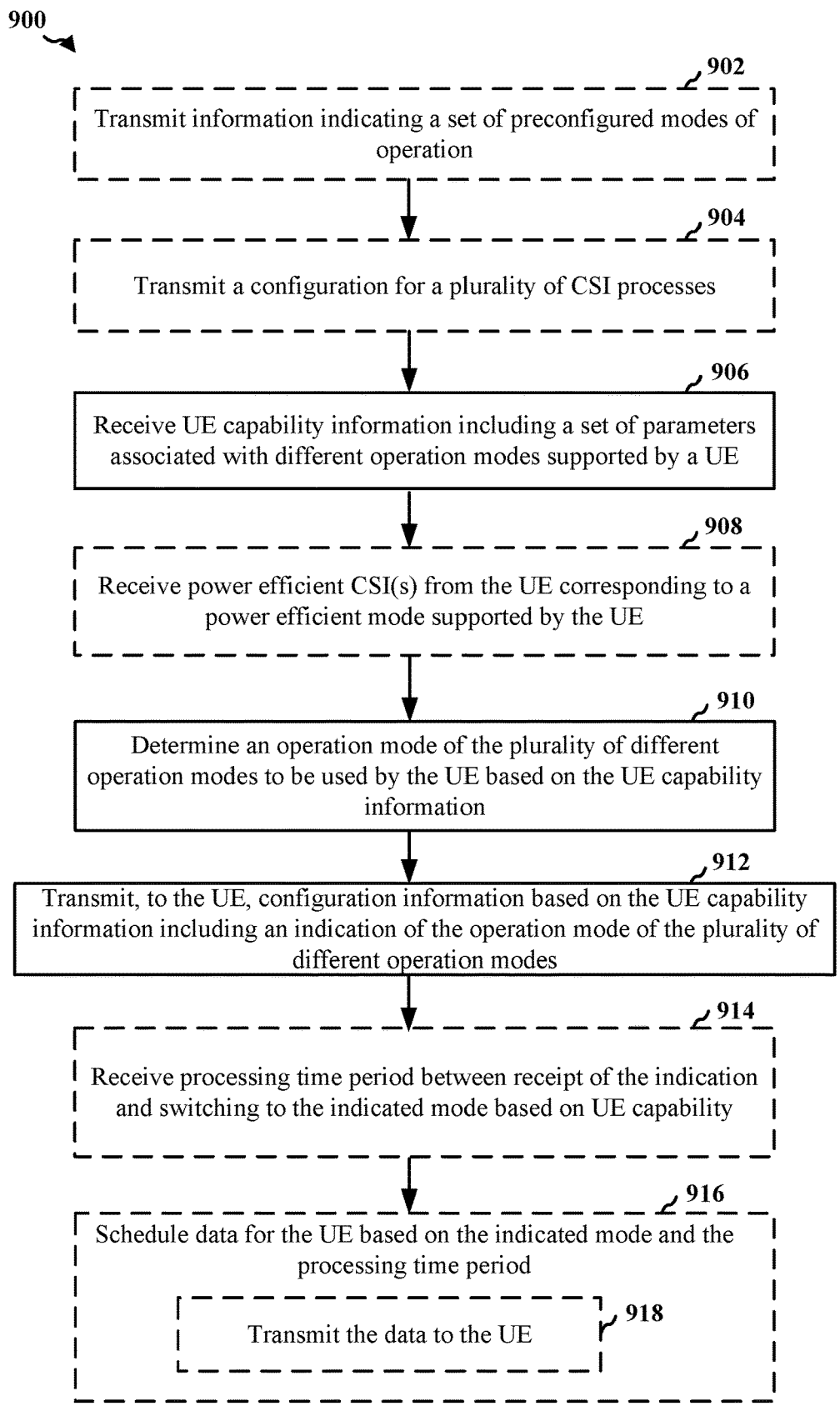
FIG. 9 is a flowchart of a method of wireless communication of a base station.

FIG. 9 is a flowchart 900 of an example method of wireless communication in accordance with aspects presented herein. The method may be performed by a base station (e.g., base station 102, 180, 310, 402, the apparatus 1002/1002', the processing system 1114, which may include the memory 376 and which may be the entire base station 310 or a component of the base station 310, such as the TX processor 316, the RX processor 370, and/or the controller/processor 375). Optional aspects are illustrated in dashed lines.

In an aspect, the network (e.g., base station) may configure various modes of operation for UEs served by the base station. For example, the base station may pre-configure one or more power efficient modes/configurations and spectrum efficient modes, where each mode/configuration may be associated with a set of parameters (e.g., operation parameters that allow the UE to operate in a given mode). For example, there may be three preconfigured power efficiency modes/configurations: a first mode/configuration may be associated with a maximum rank=rank4 and a maximum number of RBs=250RBs, a second mode/configuration may be associated with a maximum rank=rank2, and a maximum number of RBs=100RBs, and a third mode/configuration may be associated with a maximum rank=rank1, a maximum number of RBs=20RBs. In such configurations, at 902, the base station may transmit information indicating a set of preconfigured modes of operation to a UE. For example, 902 may be performed by operation mode component 1006 of FIG. 10. In some configurations, the information indicating the set of preconfigured modes may be included in a SIB, or/and paging signal and broadcast/multicast to multiple UEs. In some other configurations, the information may be sent individually (via unicast) to one or more UEs that are capable of supporting such modes.

In accordance with one aspect, the base station may configure multiple CSI processes for UEs served by the base station. For example, in one configuration, the base station may configure a spectrum efficient CSI process and one or more power efficient CSI processes. In such a configuration, at 904, the base station may transmit a configuration for a plurality of CSI processes, where a first CSI process may be based on spectrum efficiency and a second CSI process may be based on power efficiency. For example, 904 may be performed by CSI component 1008 of FIG. 10. In various configurations, a UE that may receive such configuration information may report at least power efficient CSI and/or at least spectrum efficient CSI to the base station as discussed supra in connection with FIG. 6 and further discussed below.

At 906, the base station may receive, from a UE, UE capability information including a set of parameters associated with each of a plurality of different operation modes supported by the UE. For example, 906 may be performed by operation mode component 1006 of FIG. 10. At least one of the plurality of different operation modes comprises a power efficient mode. For example, with reference to FIG. 5, the base station 402 may receive the information (e.g. in UE capability information 506) including the set of parameters associated with each of the plurality of different operation modes supported by the UE 404. As discussed supra, the set of parameters associated with a given operation mode may include one or more of a maximum MIMO rank that can be supported by the UE in the given operation mode, a maximum modulation order or MCS that can be supported in the given operation mode, a number of UE antennas that can be used in the given operation mode, a maximum RB allocation desired for the given operation mode, a preferred set of PMIs, minimum processing timelines for UE to respond in the given operation mode (e.g., K0, K1, K2 timelines), a number of BD of a PDCCH the UE can perform in the given operation mode, or a combination thereof.

At 908, the base station may receive at least one power efficient CSI from the UE. For example, 908 may be performed by CSI component 1008 of FIG. 10. The at least one power efficient CSI may correspond to a power efficient mode supported by the UE. In some configurations, the base station may receive the at least one power efficient CSI (e.g., one or more CSI reports determined with one or more parameters selected to maximize energy efficiency and reduce power consumption) in addition to a spectrum efficient CSI. In some configurations, a power efficient CSI may be determined by the UE based on one or more of: a clock frequency used by the UE in a power efficient mode, a number of receive antennas used in the power efficient mode, MIMO receiver complexity supported in the power efficient mode, a throughput that the UE can support in the power efficient mode, a number of decoder (e.g., LDPC decoder) iterations that the UE can perform in the power efficient mode, and/or other such parameters that may benefit the UE in terms of power efficiency. The UE may set these parameters at values suitable for low or ultra power consumption, measure reference signals for channel estimation with set parameter values to estimate the channel conditions and determine channel quality information or CSI for such a power efficient mode. In some configurations, the power efficient CSI may be determined by the UE further based on one or more of the parameters discussed supra (such as a maximum rank, MU-MIMO interfering streams UE is expected to handle, MCS, etc.) associated with power efficient modes/profiles that the UE may support.

At 910, the base station may determine an operation mode of the plurality of different operation modes for the UE based on the UE capability information. For example, 910 may be performed by operation mode component 1006 of FIG. 10. For example, with reference to FIG. 5, the base station may determine (at 508) a mode out of the plurality of different modes supported by the UE based on the received information from the UE. The determination may be based on the UE capability information including the set of parameters associated with each of the plurality of different operation modes supported and/or the CSI report(s) corresponding to different modes (e.g., power efficient CSI and spectrum efficient CSI) reported by the UE. For example, a power efficient mode may be associated with a power efficient CSI reported by the UE 404 to the base station 402, and the base station may determine that the UE should operate in the power efficient mode based on the power efficient CSI reported by the UE 404 at a given time (and under a given set of operating conditions that the base station may be aware of as discussed supra in more detail).

At 912, the base station may transmit to the UE configuration information for the UE based on the UE capability information, the configuration information including an indication of the determined operation mode of the plurality of different operation modes to be used by the UE. For example, 912 may be performed by operation mode component 1006 of FIG. 10. In some configurations, the indication may be transmitted via one of: semi-statically through an RRC signal, in DCI, or through a waveform sequence such as via a power saving signal or through a power saving channel.

At 914, the base station may receive information indicating a processing time period between receipt of the indication (of the determined mode) at the UE and switching by the UE to the indicated mode based on UE capability (e.g., capability with respect to processing the received indication, adjusting one or more parameters and switching to the indicated mode). For example, 914 may be performed by time gap indication component 1010 of FIG. 10. As discussed supra, some processing time may be associated with the receipt/processing of the indication at the UE, and there may be a time gap between the receipt/processing of the indication at the UE and the time when the UE may start operating in the indicated mode. For example, the indicated mode may be the power efficient mode and the UE may need to switch from a current mode (e.g., a spectrum efficient mode) to the power efficient mode. In such an example, the time gap may correspond to a time period for the UE to adjust one or more parameters to start operating in the power efficient mode after having received the indication. For example, the time period may be desired by the UE, e.g., to manage/adjust its clock frequency, antenna configuration, etc. to be in the power efficient mode. The time gap may depend on the UE implementation and/or UE type. Some UEs may take a longer time to respond and some may take a shorter time. For some UEs, it may be possible to adapt (e.g., switch to the power efficient configuration) within the same slot in which the indication is received. The base station may consider the reported time period when scheduling data for the reporting UE. In some configurations, this time period may be indicated to the base station, e.g., as part of the UE capability information (e.g., not necessarily when mode is switched by the UE) or separately. For example, referring to FIG. 5, the time gap 515 may be indicated to the base station (at 517) in UE capability information 506.

At 916, the base station may schedule data for the UE, e.g., based on the mode (determined by the base station) and the processing time period indicated by the UE. For example, 916 may be performed by scheduling component 1012 of FIG. 10. In some configurations, as part of the operation at step 916, the base station may transmit the data to the UE as illustrated at 918. For example, 918 may be performed by scheduling component 1012 of FIG. 10. For instance, referring to FIG. 5, the base station 402 may schedule and transmit data 521 to the UE in accordance with the operation mode (at 516) and based on the time gap 515 indicated by the UE 404 at 517.

Figure 10:
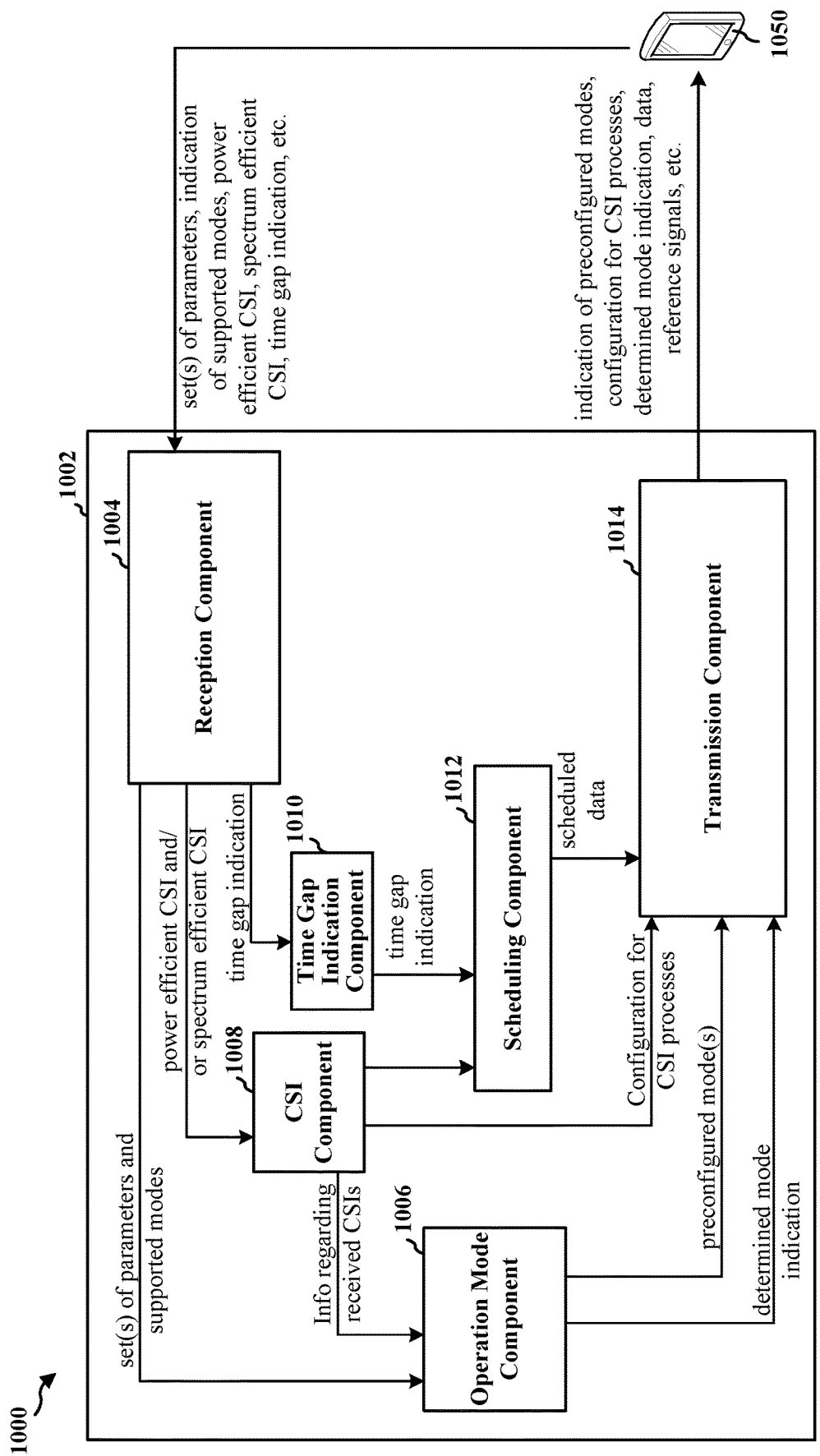
FIG. 10 is a conceptual data flow diagram illustrating the data flow between different means/components in an example apparatus, e.g., a base station.

FIG. 10 is a conceptual data flow diagram 1000 illustrating the data flow between different means/components in an example apparatus 1002. The apparatus may be a base station or a component of a base station (e.g., such as base station 102, 180, 310, 402, 750). For the purpose of discussion, we may consider that the apparatus 1002 may correspond to the base station 402 shown in FIG. 5. The apparatus 1002 may include a reception component 1004, an operation mode component 1006, a CSI component 1008, a time gap indication component 1010, a scheduling component 1012, and a transmission component 1014.

The reception component 1004 may be configured to receive signals and/or other information from other devices including, e.g., UE 1050. The signals/information received by the reception component 1004 may be provided to one or more components of the apparatus 1002 for further processing and use in performing various operations in accordance with the methods discussed supra including the method of flowchart 900. Thus, via the reception component 1004, the apparatus 1002 and/or one or more component therein receive signals and/or other information, e.g., such as UE determined set(s) of parameters and supported modes of operation, one or more CSI reports indicating power efficient CSI and/or spectrum efficient CSI, processing time gap indication, etc., from the UE 1050 as discussed supra and also discussed more specifically infra.

The operation mode component 1006 may configure one or more modes of operation for UEs in which the UEs served by the apparatus 1002 may operate as discussed supra in connection with flowchart 900. For example, the modes may include one or more power efficient modes/configurations and spectrum efficient modes. In one configuration, the operation mode component 1006 may be configured to transmit (e.g., via the transmission component 1014) information indicating a set of preconfigured modes of operation to the UE 1050, e.g., as described in connection with 902 of FIG. 9. Thus, in some configurations, one or more operation modes may be preconfigured from UE perspective. In some configurations, the information indicating the set of preconfigured modes may be included in a SIB, or/and paging signal and broadcast/multicast to multiple UEs. In some other configurations, the information may be sent individually (via unicast) to one or more UEs that are capable of supporting such modes.

In some configurations, the operation mode component 1006 may be configured to receive (e.g., via the reception component 1004) UE capability information including a set of parameters associated with each of a plurality of different operation modes supported by the UE 1050, e.g., as described in connection with 906 of FIG. 9. At least one of the plurality of different operation modes comprises a power efficient mode. In some configurations, the operation mode component 1006 may be further configured to determine an operation mode of the plurality of different operation modes for the UE based on the received UE capability information as discussed supra, e.g., in connection with FIGS. 5 and 910 of FIG. 9.

In one configuration, the CSI component 1008 may configure multiple CSI processes for the UE 1050. For example, in one configuration, the CSI component 1008 may configure a spectrum efficient CSI process and one or more power efficient CSI processes. In some such configurations, the CSI component 1008 may be configured to transmit a configuration for a plurality of CSI processes to the UE 1050, e.g., as described in connection with 904 of FIG. 9. As discussed supra, based on such configuration information, the UE 1050 may report at least a power efficient CSI and/or at least a spectrum efficient CSI to the UE 1050. In one configuration, the CSI component 1008 may be further configured to receive and process at least one power efficient CSI from the UE 1050, e.g., as described in connection with 908 of FIG. 9. The at least one power efficient CSI may correspond to a power efficient mode supported by the UE. In some configurations, the CSI component 1008 may be further configured to receive the at least one power efficient CSI (e.g., in one or more CSI reports) in addition to a spectrum efficient CSI. In some configurations, the operation mode component 1006 may be further configured to determine the mode to be used by the UE further based on the received one or more CSIs from the UE 1050. For example, in one configuration, the mode to be used by the UE 1050 may be determined further based on the at least one power efficient CSI reported by the UE 1050. In one such configuration, the determined mode for the UE 1050 may be a power efficient mode. Thus, as discussed supra, the determination may be based on the UE capability information including the set of parameters associated with each of the plurality of different operation modes supported by the UE 1050 and/or the CSI report(s) corresponding to the different modes (e.g., power efficient CSI and spectrum efficient CSI) reported by the UE 1050. In various configurations, the operation mode component 1006 may be further configured to transmit (e.g., via the transmission component 1014) to the UE 1050 configuration information for the UE based on the UE capability information including an indication of the (determined) mode of the plurality of different operation modes to be used by the UE 1050, e.g., as described in connection with 912 of FIG. 9. The indication may include, for example, information indicating to the UE 1050 whether the UE 1050 is to operate in a power efficient mode or a spectrum efficient mode. In some configurations, the indication may be transmitted via one of: semi-statically through an RRC signal, in DCI, or through a waveform sequence such as a power saving signal or through a power saving signal channel.

The time gap indication component 1010 may be configured to receive (via the reception component 1004) information indicating a processing time period (e.g., time gap) between receipt of the indication (of the determined mode) at the UE 1050 and switching by the UE 1050 to the indicated mode based on UE capability (e.g., capability with respect to processing received indication, adjusting one or more parameters and switching to the indicated mode), e.g., as described in connection with 914 of FIG. 9. The time period may depend on the UE implementation and/or UE type. Some UEs may take a longer time to respond and some may take a shorter time. The apparatus 1002 may consider the reported time period when scheduling data for the reporting UE. In some configurations, the information indicating such time period may be received by component 1010 as part of the UE capability information, while in some other configurations it may be received separately.

The scheduling component 1012 may be configured to schedule data for the UE 1050, e.g., based on the determined mode, and the processing time period indicated by the UE 1050, e.g., as described in connection with 914 of FIG. 9. In some configurations, the scheduling component 1012 may be further configured to transmit (via the transmission component 1014) the data to the UE 1050, e.g., as described in connection with 918 of FIG. 9.

The transmission component 1014 may be configured to transmit the above discussed information to one or more external devices, e.g., including the UE 1050, in accordance with the methods disclosed herein. The information to be transmitted may be included in messages/signals generated by one or more other components discussed above, or the messages/signals to be transmitted may be generated by the transmission component 1014 under the direction/control of the one or more other components discussed supra. Thus, in various configurations, via the transmission component 1014, the apparatus 1002 and/or one or more component therein transmit signals including the above discussed information (e.g., such as the determined set(s) of parameters, supported modes of operation, various determined CSI reports indicating power efficient CSI and/or spectrum efficient CSI, processing time gap indication, etc.), to external devices such as the UE 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
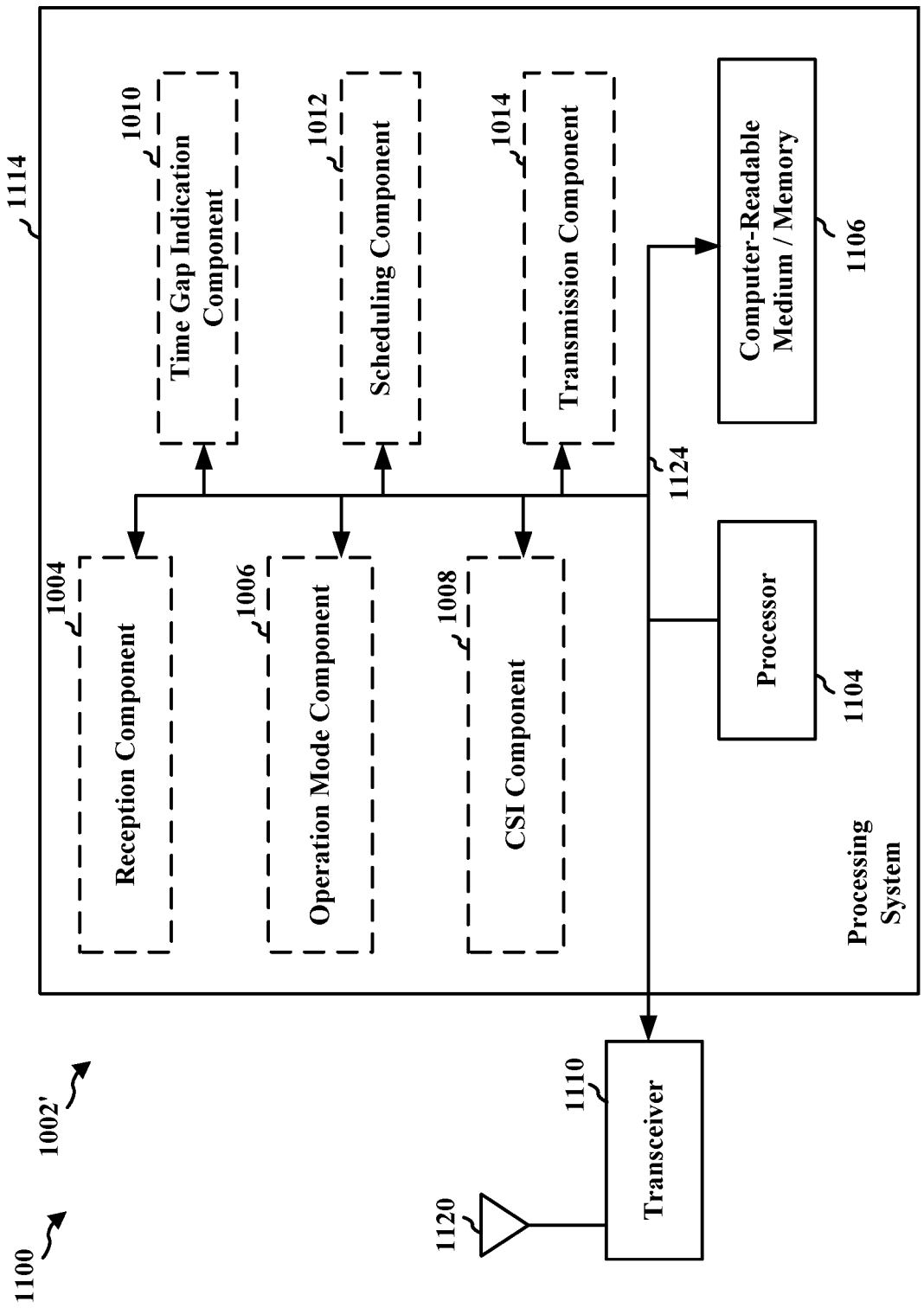
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' is a base station including means for receiving UE capability information including a set of parameters associated with each of a plurality of different operation modes supported by a UE, wherein at least one of the plurality of different operation modes comprises a power efficient mode. In some configurations, the base station may further comprise means for determining an operation mode of the plurality of different operation modes for the UE based on the UE capability information. In some configurations, the base station may further comprise means for transmitting, to the UE, configuration information for the UE based on the UE capability information, the configuration information including an indication of the operation mode of the plurality of different operation modes. In some configurations, the indication may be transmitted via one of: semi-statically through an RRC signal, in DCI, or through a power saving signal or power saving channel. In some configurations, the plurality of different operation modes may comprise at least one power efficient mode and at least one spectrum efficient mode. In some configurations, each of the plurality of different operation modes is associated with a different one of a plurality of different BWPs, where an individual set of parameters corresponding to an individual operation mode may be associated with a corresponding BWP of the plurality of different BWPs. In some configurations, the plurality of different BWPs may be configured by the base station and correspond to different power efficient modes supported by the UE. In one configuration, the base station may further comprise means for transmitting information indicating a set of preconfigured modes of operation to the UE. In some such configurations, the different operation modes supported by the UE may correspond to the preconfigured modes of operation, or may comprise a subset of the preconfigured modes of operation.

In some configurations, the base station may further comprise means for receiving at least one power efficient CSI from the UE, the at least one power efficient CSI corresponding to the power efficient mode supported by the UE. In some such configurations, the means for determining the mode may be configured to determine the operation mode of the plurality of different operation modes to be used by the UE further based on the at least one power efficient CSI, and wherein the operation mode is the power efficient mode. In some configurations, the means for receiving the at least one power efficient CSI is configured to receive the at least one power efficient CSI in addition to a spectrum efficient CSI from the UE.

In some configurations, the base station may further comprise means for receiving information indicating a processing time period between receipt of the indication at the UE and switching by the UE to the operation mode based on UE capability, wherein the operation mode is the power efficient mode.

In some configurations, the base station may further comprise means for transmitting a configuration for a plurality of CSI processes. For example, a first CSI process may be based on spectrum efficiency and a second CSI process may be based on power efficiency. The configuration for the plurality of CSI processes may be transmitted to one or more UEs in a region served by the base station.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining a set of parameters associated with each of a plurality of different operation modes supported by the UE, wherein the plurality of different operation modes comprises at least a power efficient mode and a spectrum efficient mode;
   transmitting UE capability information to a base station, the UE capability information including the set of parameters; and
   receiving configuration information for the UE based on the UE capability information, the configuration information including an indication of an operation mode of the plurality of different operation modes.

2. The method of claim 1, further comprising:
   reporting at least one power efficient CSI to the base station, the at least one power efficient CSI corresponding to the power efficient mode.

3. The method of claim 2, where the at least one power efficient CSI is determined based on one or more of:
   a clock frequency used by the UE in the power efficient mode,
   a number of receive antennas used in the power efficient mode,
   MIMO receiver complexity supported in the power efficient mode,
   a throughput that the UE can support in the power efficient mode,
   a number of decoder iterations that the UE can perform in the power efficient mode, or a combination thereof.

4. The method of claim 2, wherein receiving the indication of the operation mode of the plurality of different operation modes to be used by the UE is further based on the at least one power efficient CSI reported by the UE, and wherein the operation mode is the power efficient mode.

5. The method of claim 2, wherein the indication is received via one of:
   semi-statically through a radio resource connection (RRC) signal or in downlink control information (DCI).

6. The method of claim 2, wherein the indication is received via a power saving signal or through a power saving signal channel.

7. The method of claim 2, further comprising:
   reporting a plurality of CSIs, wherein each CSI of the plurality of CSIs corresponds to one of the plurality of different operation modes; and
   wherein the at least one power efficient CSI is one of the plurality of CSIs reported in addition to a spectrum efficient CSI reported by the UE.

8. The method of claim 1, wherein a set of parameters associated with a given operation mode of the plurality of different operation modes comprises minimum processing timelines for the UE to respond in the given operation mode.

9. The method of claim 1, wherein a set of parameters associated with a given operation mode of the plurality of different operation modes comprises a maximum multiple input multiple output (MIMO) rank that can be supported by the UE in the given operation mode.

10. The method of claim 9, wherein the set of parameters associated with the given operation mode of the plurality of different operation modes further comprises a number of UE antennas that can be used in the given operation mode.

11. The method of claim 1, wherein a set of parameters associated with a given operation mode of the plurality of different operation modes comprises one or more of:
- a maximum modulation order or modulation and coding scheme (MCS) that can be supported in the given operation mode,
- a maximum resource block (RB) allocation for the given operation mode,
- a preferred set of precoding matrix indicators (PMIs),
- a number of blind decoding (BD) of a physical downlink control channel (PDCCH) the UE can perform in the given operation mode, or
- a combination thereof.

12. The method of claim 1, further comprising:
- adjusting one or more parameters based on the indication to start operating in the operation mode, wherein the operation mode is the power efficient mode; and
- operating in the power efficient mode based on the one or more parameters adjusted based on the indication.

13. The method of claim 12, wherein a time gap between receipt of the indication and switching to the power efficient mode is based on UE type.

14. The method of claim 12, wherein the power efficient mode is switched within a same slot in which the indication is received.

15. The method of claim 12, wherein the power efficient mode is switched to a different power efficiency mode within a grace period based on UE capability.

16. The method of claim 12, wherein a processing time period between receipt of the indication and switching to the power efficient mode is based on UE capability.

17. The method of claim 16, further comprising:
- transmitting information indicating the processing time period to the base station as part of the UE capability information.

18. The method of claim 1, further comprising:
- receiving a configuration from the base station for a plurality of CSI processes, wherein a first CSI process is based on spectrum efficiency and a second CSI process is based on power efficiency.

19. The method of claim 1, wherein each of the plurality of different operation modes is associated with a different one of a plurality of different bandwidth parts (BWPs), an individual set of parameters corresponding to an individual operation mode being associated with a corresponding BWP of the plurality of different BWPs.

20. The method of claim 19, wherein the plurality of different BWPs are configured by the base station and correspond to different power efficient modes supported by the UE.

21. The method of claim 1, wherein a mode of operation is selected from a set of preconfigured modes of operation, wherein different operation modes supported by the UE comprise a subset of the set of preconfigured modes of operation.

22. A user equipment (UE), comprising:
- means for determining a set of parameters associated with each of a plurality of different operation modes supported by the UE, wherein the plurality of different operation modes comprises at least a power efficient mode and a spectrum efficient mode;
- means for transmitting UE capability information to a base station, the UE capability information including the set of parameters; and
- means for receiving configuration information for the UE based on the UE capability information, the configuration information including an indication of an operation mode of the plurality of different operation modes.

23. The UE of claim 22, further comprising:
- means for reporting at least one power efficient CSI to the base station, the at least one power efficient CSI corresponding to the power efficient mode,
- wherein the at least one power efficient CSI is determined based on one or more of:
  - a clock frequency used by the UE in the power efficient mode,
  - a number of receive antennas used in the power efficient mode,
  - MIMO receiver complexity supported in the power efficient mode,
  - a throughput that the UE can support in the power efficient mode,
  - a number of decoder iterations that the UE can perform in the power efficient mode, or
  - a combination thereof.

24. The UE of claim 23, wherein the means for reporting is further configured to report a plurality of CSIs, wherein each CSI of the plurality of CSIs corresponds to one of the plurality of different operation modes; and
wherein the at least one power efficient CSI is one of the plurality of CSIs reported in addition to a spectrum efficient CSI reported by the UE.

25. The UE of claim 22, further comprising:
- means for adjusting one or more parameters based on the indication to start operating in the operation mode, wherein the operation mode is the power efficient mode; and
- means for operating in the power efficient mode based on the one or more parameters adjusted based on the indication.

26. The UE of claim 25, wherein a processing time period between receipt of the indication and switching to the power efficient mode is based on UE capability.

27. The UE of claim 26, wherein the means for transmitting is further configured to transmit information indicating the processing time period to the base station as part of the UE capability information.

28. The UE of claim 22, wherein the means for receiving is further configured to receive a configuration from the base station for a plurality of CSI processes, wherein a first CSI process is based on spectrum efficiency and a second CSI process is based on power efficiency.

29. A user equipment (UE), comprising:
- a memory; and
- at least one processor coupled to the memory and configured to:
  - determine a set of parameters associated with each of a plurality of different operation modes supported by the UE, wherein the plurality of different operation modes comprises at least a power efficient mode and a spectrum efficient mode; and
  - transmit UE capability information to a base station, the UE capability information including the set of parameters; and
  - receive configuration information for the UE based on the UE capability information, the configuration information including an indication of an operation mode of the plurality of different operation modes.

30. The UE of claim 29, wherein the at least one processor is further configured to:
- report at least one power efficient CSI to the base station, the at least one power efficient CSI corresponding to the power efficient mode.

31. The UE of claim 30, where the at least one power efficient CSI is determined based on one or more of:
- a clock frequency used by the UE in the power efficient mode,
- a number of receive antennas used in the power efficient mode,
- MIMO receiver complexity supported in the power efficient mode,
- a throughput that the UE can support in the power efficient mode,
- a number of decoder iterations that the UE can perform in the power efficient mode, or
- a combination thereof.

32. The UE of claim 30, wherein the indication of the operation mode of the plurality of different operation modes to be used by the UE is further based on the at least one power efficient CSI reported by the UE, and wherein the operation mode is the power efficient mode.

33. The UE of claim 30, wherein the indication is received via one of:
- semi-statically through a radio resource connection (RRC) signal or in downlink control information (DCI).

34. The UE of claim 30, wherein the indication is received via a power saving signal or through a power saving signal channel.

35. The UE of claim 30, wherein the at least one processor is further configured to:
- report a plurality of CSIs, wherein each CSI of the plurality of CSIs corresponds to one of the plurality of different operation modes; and
- wherein the at least one power efficient CSI is one of the plurality of CSIs reported in addition to a spectrum efficient CSI reported by the UE.

36. The UE of claim 29, wherein the set of parameters associated with a given operation mode comprises minimum processing timelines for the UE to respond in the given operation mode.

37. The UE of claim 29, wherein a set of parameters associated with a given operation mode of the plurality of different operation modes comprises a maximum multiple input multiple output (MIMO) rank that can be supported by the UE in the given operation mode.

38. The UE of claim 37, wherein the set of parameters associated with the given operation mode of the plurality of different operation modes further comprises a number of UE antennas that can be used in the given operation mode.

39. The UE of claim 29, wherein a set of parameters associated with a given operation mode of the plurality of different operation modes comprises one or more of:
- a maximum modulation order or modulation and coding scheme (MCS) that can be supported in the given operation mode,
- a maximum resource block (RB) allocation for the given operation mode,
- a preferred set of precoding matrix indicators (PMIs),
- a number of blind decoding (BD) of a physical downlink control channel (PDCCH) the UE can perform in the given operation mode, or
- a combination thereof.

40. The UE of claim 29, wherein the at least one processor is further configured to:
- adjust one or more parameters based on the indication to start operating in the operation mode, wherein the operation mode is the power efficient mode; and
- operate in the power efficient mode based on the one or more parameters adjusted based on the indication.

41. The UE of claim 40, wherein a processing time period between receipt of the indication and switching to the power efficient mode is based on UE capability.

42. The UE of claim 41, wherein the at least one processor is further configured to:
- transmit information indicating the processing time period to the base station as part of the UE capability information.

43. The UE of claim 40, wherein a time gap between receipt of the indication and switching to the power efficient mode is based on UE type.

44. The UE of claim 40, wherein the power efficient mode is switched within a same slot in which the indication is received.

45. The UE of claim 40, wherein the power efficient mode is switched to a different power efficiency mode within a grace period based on UE capability.

46. The UE of claim 29, wherein the at least one processor is further configured to:
- receive a configuration from the base station for a plurality of CSI processes, wherein a first CSI process is based on spectrum efficiency and a second CSI process is based on power efficiency.

47. The UE of claim 29, wherein each of the plurality of different operation modes is associated with a different one of a plurality of different bandwidth parts (BWPs), an individual set of parameters corresponding to an individual operation mode being associated with a corresponding BWP of the plurality of different BWPs.

48. The UE of claim 47, wherein the plurality of different BWPs are configured by the base station and correspond to different power efficient modes supported by the UE.

49. The UE of claim 29, wherein a mode of operation is selected from a set of preconfigured modes of operation, wherein different operation modes supported by the UE comprise a subset of the set of preconfigured modes of operation.

50. A non-transitory computer-readable medium storing computer executable code, comprising code to:
- determine a set of parameters associated with each of a plurality of different operation modes supported by a UE, wherein the plurality of different operation modes comprises at least a power efficient mode and a spectrum efficient mode;
- transmit UE capability information to a base station, the capability UE information including the set of parameters; and
- receive configuration information for the UE based on the UE capability information, the configuration information including an indication of an operation mode of the plurality of different operation modes.

51. A method of wireless communication of a base station, comprising:
- receiving UE capability information including a set of parameters associated with each of a plurality of different operation modes supported by a UE, wherein the plurality of different operation modes comprises at least a power efficient mode and a spectrum efficient mode;
- determining an operation mode of the plurality of different operation modes for the UE based on the UE capability information; and
- transmitting, to the UE, configuration information for the UE based on the UE capability information, the configuration information including an indication of the operation mode of the plurality of different operation modes.

52. The method of claim 51, further comprising:
receiving at least one power efficient CSI from the UE, the at least one power efficient CSI corresponding to the power efficient mode supported by the UE.

53. The method of claim 52, where the at least one power efficient CSI is determined based on one or more of:
a clock frequency used by the UE in the power efficient mode,
a number of receive antennas used in the power efficient mode,
MIMO receiver complexity supported in the power efficient mode,
a throughput that the UE can support in the power efficient mode,
a number of decoder iterations that the UE can perform in the power efficient mode, or
a combination thereof.

54. The method of claim 52, wherein the operation mode of the plurality of different operation modes to be used by the UE is further based on the at least one power efficient CSI, and wherein the operation mode comprises the power efficient mode.

55. The method of claim 52, wherein the indication is transmitted via one of:
semi-statically through a radio resource connection (RRC) signal or in downlink control information (DCI).

56. The method of claim 52, wherein the indication is transmitted via a power saving signal or through a power saving signal channel.

57. The method of claim 52, wherein the at least one power efficient CSI is received in addition to a spectrum efficient CSI from the UE.

58. The method of claim 51, wherein the set of parameters associated with a given operation mode comprises minimum processing timelines for the UE to respond in the given operation mode.

59. The method of claim 51, wherein the set of parameters associated with a given operation mode comprises a maximum multiple input multiple output (MIMO) rank that can be supported by the UE in the given operation mode.

60. The method of claim 59, wherein the set of parameters associated with the given operation mode further comprises a number of UE antennas that can be used in the given operation mode.

61. The method of claim 51, wherein the set of parameters associated with a given operation mode comprises one or more of:
a maximum modulation order or modulation and coding scheme (MCS) that can be supported in the given operation mode,
a maximum resource block (RB) allocation for the given operation mode,
a preferred set of precoding matrix indicators (PMIs),
a number of blind decoding (BD) of a physical downlink control channel (PDCCH) the UE can perform in the given operation mode, or
a combination thereof.

62. The method of claim 51, further comprising:
receiving information indicating a processing time period between receipt of the indication at the UE and switching by the UE to the operation mode based on UE capability, wherein the operation mode is the power efficient mode.

63. The method of claim 51, further comprising:
transmitting a configuration for a plurality of CSI processes, wherein a first CSI process is based on spectrum efficiency and a second CSI process is based on power efficiency.

64. The method of claim 51, wherein each of the plurality of different operation modes is associated with a different one of a plurality of different bandwidth parts (BWPs), an individual set of parameters corresponding to an individual operation mode being associated with a corresponding BWP of the plurality of different BWPs.

65. The method of claim 64, wherein the plurality of different BWPs are configured by the base station and correspond to different power efficient modes supported by the UE.

66. The method of claim 51, further comprising:
transmitting information indicating a set of preconfigured modes of operation to the UE, wherein the plurality of different operation modes supported by the UE comprise a subset of the set of preconfigured modes of operation.

67. A base station, comprising:
means for receiving UE capability information including a set of parameters associated with each of a plurality of different operation modes supported by a UE, wherein the plurality of different operation modes comprises at least a power efficient mode and a spectrum efficient mode;
means for determining an operation mode of the plurality of different operation modes for the UE based on the UE capability information; and
means for transmitting, to the UE, configuration information for the UE based on the UE capability information, the configuration information including an indication of the operation mode of the plurality of different operation modes.

68. The base station of claim 67, wherein the means for receiving is further configured to receive at least one power efficient CSI from the UE, the at least one power efficient CSI corresponding to the power efficient mode supported by the UE; and
wherein the at least one power efficient CSI is determined based on one or more of:
a clock frequency used by the UE in the power efficient mode,
a number of receive antennas used in the power efficient mode,
MIMO receiver complexity supported in the power efficient mode,
a throughput that the UE can support in the power efficient mode,
a number of decoder iterations that the UE can perform in the power efficient mode, or
a combination thereof.

69. The base station of claim 67, wherein the means for receiving is further configured to receive information indicating a processing time period between receipt of the indication at the UE and switching by the UE to the operation mode based on UE capability, wherein the operation mode is the power efficient mode.

70. The base station of claim 67, wherein the means for transmitting is further configured to transmit a configuration for a plurality of CSI processes, wherein a first CSI process is based on spectrum efficiency and a second CSI process is based on power efficiency.

71. The base station of claim 67, wherein the means for transmitting is further configured to transmit information indicating a set of preconfigured modes of operation to the UE, wherein the plurality of different operation modes supported by the UE comprise a subset of the set of preconfigured modes of operation.

72. A base station, comprising:
a memory; and
at least one processor coupled to the memory and configured to:
receive UE capability information including a set of parameters associated with each of a plurality of different operation modes supported by a UE, wherein the plurality of different operation modes comprises at least a power efficient mode and a spectrum efficient mode;
determine an operation mode of the plurality of different operation modes for the UE based on the UE capability information; and
transmit, to the UE, configuration information for the UE based on the UE capability information, the configuration information including an indication of the operation mode of the plurality of different operation modes.

73. The base station of claim 72, wherein the at least one processor is further configured to:
receive at least one power efficient CSI from the UE, the at least one power efficient CSI corresponding to the power efficient mode supported by the UE.

74. The base station of claim 73, where the at least one power efficient CSI is determined based on one or more of:
a clock frequency used by the UE in the power efficient mode,
a number of receive antennas used in the power efficient mode,
MIMO receiver complexity supported in the power efficient mode,
a throughput that the UE can support in the power efficient mode,
a number of decoder iterations that the UE can perform in the power efficient mode, or
a combination thereof.

75. The base station of claim 73, wherein the operation mode of the plurality of different operation modes to be used by the UE is further based on the at least one power efficient CSI, and wherein the operation mode comprises the power efficient mode.

76. The base station of claim 73, wherein the indication is transmitted via one of:
semi-statically through a radio resource connection (RRC) signal or in downlink control information (DCI).

77. The base station of claim 73, wherein the indication is transmitted via a power saving signal or through a power saving signal channel.

78. The base station of claim 73, wherein the at least one power efficient CSI is received in addition to a spectrum efficient CSI from the UE.

79. The base station of claim 72, wherein the set of parameters associated with a given operation mode comprises minimum processing timelines for the UE to respond in the given operation mode.

80. The base station of claim 72, wherein the set of parameters associated with a given operation mode comprises a maximum multiple input multiple output (MIMO) rank that can be supported by the UE in the given operation mode.

81. The base station of claim 80, wherein the set of parameters associated with the given operation mode further comprises a number of UE antennas that can be used in the given operation mode.

82. The base station of claim 72, wherein the set of parameters associated with a given operation mode comprises one or more of:
a maximum modulation order or modulation and coding scheme (MCS) that can be supported in the given operation mode,
a maximum resource block (RB) allocation for the given operation mode,
a preferred set of precoding matrix indicators (PMIs),
a number of blind decoding (BD) of a physical downlink control channel (PDCCH) the UE can perform in the given operation mode, or
a combination thereof.

83. The base station of claim 72, wherein the at least one processor is further configured to:
receive information indicating a processing time period between receipt of the indication at the UE and switching by the UE to the operation mode based on UE capability, wherein the operation mode is the power efficient mode.

84. The base station of claim 72, wherein the at least one processor is further configured to:
transmit a configuration for a plurality of CSI processes, wherein a first CSI process is based on spectrum efficiency and a second CSI process is based on power efficiency.

85. The base station of claim 72, wherein each of the plurality of different operation modes is associated with a different one of a plurality of different bandwidth parts (BWPs), an individual set of parameters corresponding to an individual operation mode being associated with a corresponding BWP of the plurality of different BWPs.

86. The base station of claim 85, wherein the plurality of different BWPs are configured by the base station and correspond to different power efficient modes supported by the UE.

87. The base station of claim 72, wherein the at least one processor is further configured to:
transmit information indicating a set of preconfigured modes of operation to the UE, wherein the plurality of different operation modes supported by the UE comprise a subset of the set of preconfigured modes of operation.

88. A non-transitory computer-readable medium storing computer executable code, comprising code to:
receive UE capability information including a set of parameters associated with each of a plurality of different operation modes supported by a UE, wherein the plurality of different operation modes comprises at least a power efficient mode and a spectrum efficient mode;
determine an operation mode of the plurality of different operation modes for the UE based on the UE capability information; and
transmit, to the UE, configuration information for the UE based on the UE capability information, the configuration information including an indication of the operation mode of the plurality of different operation modes.

* * * * *